(12) United States Patent
Meruva et al.

(10) Patent No.: US 12,260,140 B2
(45) Date of Patent: Mar. 25, 2025

(54) PROVIDING A COMFORT DASHBOARD

(71) Applicant: Honeywell International Inc., Charlotte, NC (US)

(72) Inventors: Jayaprakash Meruva, Bangalore (IN); Andrew Lo, Balmain (AU); John Boothroyd, NorthRyde (AU); Hao Chen, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 219 days.

(21) Appl. No.: 17/556,328

(22) Filed: Dec. 20, 2021

(65) Prior Publication Data

US 2022/0113924 A1 Apr. 14, 2022

Related U.S. Application Data

(63) Continuation of application No. 15/941,952, filed on Mar. 30, 2018, now abandoned.

(Continued)

(51) Int. Cl.
*G06F 3/14* (2006.01)
*F24F 11/52* (2018.01)
(Continued)

(52) U.S. Cl.
CPC .............. *G06F 3/14* (2013.01); *F24F 11/52* (2018.01); *F24F 11/523* (2018.01);
(Continued)

(58) Field of Classification Search
CPC ...... G06F 3/14; G06F 3/04847; F24F 11/523; F24F 11/52; F24F 2110/20;
(Continued)

(56) References Cited

U.S. PATENT DOCUMENTS 191,512 A 6/1877 Bennett et al.
4,009,647 A 3/1977 Howorth
(Continued)

FOREIGN PATENT DOCUMENTS

CA 2387100 A1 11/2003
CA 2538139 A1 3/2005
(Continued)

OTHER PUBLICATIONS

Johnson Controls Develops Industry-first AI Driven Digital Solution to Manage Clean Air, Energy, Sustainability, Comfort and Cost in Buildings, 7 pages, 2022. Accessed Aug. 29, 2022.
(Continued)

*Primary Examiner* — Toan H Vu
(74) *Attorney, Agent, or Firm* — Seager, Tufte & Wickhem, LLP

(57) ABSTRACT

Systems, methods, and devices for providing a comfort dashboard are described herein. One method includes receiving operational data associated with an HVAC system of a facility, receiving credentials associated with a user of a user device including a number of display elements configurable by the user, and determining a particular portion of the operational data to provide to the user via the display elements of the user device based, at least in part, on the credentials.

20 Claims, 9 Drawing Sheets

Related U.S. Application Data

(60) Provisional application No. 62/480,047, filed on Mar. 31, 2017.

(51) Int. Cl.
    *F24F 11/523*     (2018.01)
    *G06F 3/04847*     (2022.01)
    *F24F 11/46*     (2018.01)
    *F24F 11/58*     (2018.01)
    *F24F 110/10*     (2018.01)
    *F24F 110/20*     (2018.01)
    *F24F 120/10*     (2018.01)
    *F24F 130/20*     (2018.01)

(52) U.S. Cl.
    CPC .......... *G06F 3/04847* (2013.01); *F24F 11/46* (2018.01); *F24F 11/58* (2018.01); *F24F 2110/10* (2018.01); *F24F 2110/20* (2018.01); *F24F 2120/10* (2018.01); *F24F 2130/20* (2018.01)

(58) Field of Classification Search
    CPC .... F24F 2120/10; F24F 2130/20; F24F 11/46; F24F 2110/10; F24F 11/58
    USPC ........................................................ 715/741
    See application file for complete search history.

(56) References Cited

U.S. PATENT DOCUMENTS

| | | |
|---|---|---|
| 4,375,637 A | 3/1983 | Desjardins |
| 4,918,615 A | 4/1990 | Suzuki et al. |
| 4,939,922 A | 7/1990 | Smalley et al. |
| 5,566,084 A | 10/1996 | Cmar |
| 5,727,579 A | 3/1998 | Chardack |
| 5,745,126 A | 4/1998 | Jain et al. |
| 5,751,916 A | 5/1998 | Kon et al. |
| 5,777,598 A | 7/1998 | Gowda et al. |
| 5,973,662 A | 10/1999 | Singers et al. |
| 6,065,842 A | 5/2000 | Fink |
| 6,139,177 A | 10/2000 | Venkatraman et al. |
| 6,144,993 A | 11/2000 | Fukunaga et al. |
| 6,157,943 A | 12/2000 | Meyer |
| 6,229,429 B1 | 5/2001 | Horon |
| 6,238,337 B1 | 5/2001 | Kambhatla et al. |
| 6,334,211 B1 | 12/2001 | Kojima et al. |
| 6,353,853 B1 | 3/2002 | Gravlin |
| 6,369,695 B2 | 4/2002 | Horon |
| 6,375,038 B1 | 4/2002 | Daansen et al. |
| 6,429,868 B1 | 8/2002 | Dehner, Jr. et al. |
| 6,473,084 B1 | 10/2002 | Phillips et al. |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,704,012 B1 | 3/2004 | Lefave |
| 6,720,874 B2 | 4/2004 | Fufido et al. |
| 6,741,915 B2 | 5/2004 | Poth |
| 6,796,896 B2 | 9/2004 | Laiti |
| 6,801,199 B1 | 10/2004 | Wallman |
| 6,816,878 B1 | 11/2004 | Zimmers et al. |
| 6,876,951 B2 | 4/2005 | Skidmore et al. |
| 6,882,278 B2 | 4/2005 | Winings et al. |
| 6,904,385 B1 | 6/2005 | Budike, Jr. |
| 6,907,387 B1 | 6/2005 | Reardon |
| 6,911,177 B2 | 6/2005 | Deal |
| 6,993,403 B1 | 1/2006 | Dadebo et al. |
| 6,993,417 B2 | 1/2006 | Osann, Jr. |
| 7,023,440 B1 | 4/2006 | Havekost et al. |
| 7,031,880 B1 | 4/2006 | Seem et al. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,111 B1 | 5/2007 | Budike, Jr. |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,295,116 B2 | 11/2007 | Kumar et al. |
| 7,302,313 B2 | 11/2007 | Sharp et al. |
| 7,308,323 B2 | 12/2007 | Kruk et al. |
| 7,308,388 B2 | 12/2007 | Beverina et al. |
| 7,313,447 B2 | 12/2007 | Hsiung et al. |
| 7,346,433 B2 | 3/2008 | Budike, Jr. |
| 7,356,548 B1 | 4/2008 | Culp et al. |
| 7,379,782 B1 | 5/2008 | Cocco |
| 7,383,148 B2 | 6/2008 | Ahmed |
| 7,434,742 B2 | 10/2008 | Mueller et al. |
| 7,447,333 B1 | 11/2008 | Masticola et al. |
| 7,466,224 B2 | 12/2008 | Ward et al. |
| 7,496,472 B2 | 2/2009 | Seem |
| 7,512,450 B2 | 3/2009 | Ahmed |
| 7,516,490 B2 | 4/2009 | Riordan et al. |
| 7,548,833 B2 | 6/2009 | Ahmed |
| 7,551,092 B1 | 6/2009 | Henry |
| 7,557,729 B2 | 7/2009 | Hubbard et al. |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,682,464 B2 | 3/2010 | Glenn et al. |
| 7,702,421 B2 | 4/2010 | Sullivan et al. |
| 7,729,882 B2 | 6/2010 | Seem |
| 7,755,494 B2 | 7/2010 | Melker et al. |
| 7,761,310 B2 | 7/2010 | Rodgers |
| 7,774,227 B2 | 8/2010 | Srivastava |
| 7,797,188 B2 | 9/2010 | Srivastava |
| 7,819,136 B1 | 10/2010 | Eddy |
| 7,822,806 B2 | 10/2010 | Frank et al. |
| 7,856,370 B2 | 12/2010 | Katta et al. |
| 7,978,083 B2 | 7/2011 | Melker et al. |
| 7,984,384 B2 | 7/2011 | Chaudhri et al. |
| 7,986,323 B2 | 7/2011 | Kobayashi et al. |
| 8,024,666 B2 | 9/2011 | Thompson |
| 8,086,047 B2 | 12/2011 | Penke et al. |
| 8,099,178 B2 | 1/2012 | Mairs et al. |
| 8,151,280 B2 | 4/2012 | Sather et al. |
| 8,176,095 B2 | 5/2012 | Murray et al. |
| 8,218,871 B2 | 7/2012 | Angell et al. |
| 8,219,660 B2 | 7/2012 | McCoy et al. |
| 8,271,941 B2 | 9/2012 | Zhang et al. |
| 8,294,585 B2 | 10/2012 | Barnhill |
| 8,302,020 B2 | 10/2012 | Louch et al. |
| 8,320,634 B2 | 11/2012 | Deutsch |
| 8,334,422 B2 | 12/2012 | Gutsol et al. |
| 8,344,893 B1 | 1/2013 | Drammeh |
| 8,375,118 B2 | 2/2013 | Hao et al. |
| 8,473,080 B2 | 6/2013 | Seem et al. |
| 8,476,590 B2 | 7/2013 | Stratmann et al. |
| 8,516,016 B2 | 8/2013 | Park et al. |
| 8,558,660 B2 | 10/2013 | Nix et al. |
| 8,639,527 B2 | 1/2014 | Rensvold et al. |
| 8,698,637 B2 | 4/2014 | Raichman |
| 8,816,860 B2 | 8/2014 | Ophardt et al. |
| 8,869,027 B2 | 10/2014 | Louch et al. |
| 8,904,497 B2 | 12/2014 | Hsieh |
| 8,936,944 B2 | 1/2015 | Peltz et al. |
| 8,947,437 B2 | 2/2015 | Garr et al. |
| 8,950,019 B2 | 2/2015 | Loberger et al. |
| 9,000,926 B2 | 4/2015 | Hollock et al. |
| 9,002,532 B2 | 4/2015 | Asmus |
| 9,030,325 B2 | 5/2015 | Taneff |
| 9,098,738 B2 | 8/2015 | Bilet et al. |
| 9,105,071 B2 | 8/2015 | Fletcher et al. |
| 9,175,356 B2 | 11/2015 | Peltz et al. |
| 9,235,657 B1 | 1/2016 | Wenzel et al. |
| 9,240,111 B2 | 1/2016 | Scott et al. |
| 9,256,702 B2 | 2/2016 | Elbsat et al. |
| 9,280,884 B1 | 3/2016 | Schultz et al. |

(56) References Cited

U.S. PATENT DOCUMENTS

| | | |
|---|---|---|
| 9,292,972 B2 | 3/2016 | Hailemariam et al. |
| 9,320,662 B2 | 4/2016 | Hayes et al. |
| 9,322,566 B2 | 4/2016 | Wenzel et al. |
| 9,355,069 B2 | 5/2016 | Elbsat et al. |
| 9,370,600 B1 | 6/2016 | DuPuis et al. |
| 9,373,242 B1 | 6/2016 | Conrad et al. |
| 9,396,638 B2 | 7/2016 | Wildman et al. |
| 9,311,807 B2 | 8/2016 | Schultz et al. |
| 9,406,212 B2 | 8/2016 | De Luca et al. |
| 9,418,535 B1 | 8/2016 | Felch et al. |
| 9,418,536 B1 | 8/2016 | Felch et al. |
| 9,436,179 B1 | 9/2016 | Turney et al. |
| 9,449,219 B2 | 9/2016 | Bilet et al. |
| 9,477,543 B2 | 10/2016 | Henley et al. |
| 9,497,832 B2 | 11/2016 | Verberkt et al. |
| 9,513,364 B2 | 12/2016 | Hall et al. |
| 9,526,380 B2 | 12/2016 | Hamilton et al. |
| 9,526,806 B2 | 12/2016 | Park et al. |
| 9,536,415 B2 | 1/2017 | De Luca et al. |
| 9,558,648 B2 | 1/2017 | Douglas |
| 9,568,204 B2 | 2/2017 | Asmus et al. |
| 9,581,985 B2 | 2/2017 | Walser et al. |
| 9,591,267 B2 | 3/2017 | Lipton et al. |
| 9,606,520 B2 | 3/2017 | Noboa et al. |
| 9,612,601 B2 | 4/2017 | Beyhaghi et al. |
| 9,613,518 B2 | 4/2017 | Dunn et al. |
| 9,618,224 B2 | 4/2017 | Emmons et al. |
| 9,640,059 B2 | 5/2017 | Hyland |
| 9,672,360 B2 | 6/2017 | Barkan |
| 9,696,054 B2 | 7/2017 | Asmus |
| 9,710,700 B2 | 7/2017 | Bilet et al. |
| 9,715,242 B2 | 7/2017 | Pillai et al. |
| 9,721,452 B2 | 8/2017 | Felch et al. |
| 9,729,945 B2 | 8/2017 | Schultz et al. |
| 9,778,639 B2 | 10/2017 | Boettcher et al. |
| 9,784,464 B2 | 10/2017 | Yamamoto et al. |
| 9,798,336 B2 | 10/2017 | Przybylski |
| 9,843,743 B2 | 12/2017 | Lewis et al. |
| 9,852,481 B1 | 12/2017 | Turney et al. |
| 9,856,634 B2 | 1/2018 | Rodenbeck et al. |
| 9,872,088 B2 | 1/2018 | Fadell et al. |
| 9,875,639 B2 | 1/2018 | Bone et al. |
| 9,911,312 B2 | 3/2018 | Wildman et al. |
| 9,940,819 B2 | 4/2018 | Ferniany |
| 9,956,306 B2 | 5/2018 | Brais et al. |
| 9,982,903 B1 | 5/2018 | Ridder et al. |
| 9,986,175 B2 | 5/2018 | Frank et al. |
| 10,007,259 B2 | 6/2018 | Turney et al. |
| 10,055,114 B2 | 8/2018 | Shah et al. |
| 10,087,608 B2 | 10/2018 | Dobizl et al. |
| 10,101,730 B2 | 10/2018 | Wenzel et al. |
| 10,101,731 B2 | 10/2018 | Asmus et al. |
| 10,175,681 B2 | 1/2019 | Wenzel et al. |
| 10,222,083 B2 | 3/2019 | Drees et al. |
| 10,223,894 B2 | 3/2019 | Raichman |
| 10,228,837 B2 | 3/2019 | Hua et al. |
| 10,235,865 B2 | 3/2019 | Thyroff |
| 10,251,610 B2 | 4/2019 | Parthasarathy et al. |
| 10,282,796 B2 | 5/2019 | Elbsat et al. |
| 10,288,306 B2 | 5/2019 | Ridder et al. |
| 10,303,843 B2 | 5/2019 | Bitran et al. |
| 10,317,864 B2 | 6/2019 | Boettcher et al. |
| 10,332,382 B2 | 6/2019 | Thyroff |
| 10,359,748 B2 | 7/2019 | Elbsat et al. |
| 10,386,820 B2 | 8/2019 | Wenzel et al. |
| 10,402,767 B2 | 9/2019 | Noboa et al. |
| 10,514,178 B2 | 12/2019 | Willmott et al. |
| 10,514,817 B2 | 12/2019 | Hua et al. |
| 10,520,210 B2 | 12/2019 | Park et al. |
| 10,544,955 B2 | 1/2020 | Przybylski |
| 10,558,178 B2 | 2/2020 | Willmott et al. |
| 10,559,180 B2 | 2/2020 | Pourmohammad et al. |
| 10,559,181 B2 | 2/2020 | Pourmohammad et al. |
| 10,565,844 B2 | 2/2020 | Pourmohammad et al. |
| 10,600,263 B2 | 3/2020 | Park et al. |
| 10,602,474 B2 | 3/2020 | Goldstein |
| 10,605,477 B2 | 3/2020 | Ridder |
| 10,607,147 B2 | 3/2020 | Raykov et al. |
| 10,619,882 B2 | 4/2020 | Chatterjee et al. |
| 10,627,124 B2 | 4/2020 | Walser et al. |
| 10,673,380 B2 | 6/2020 | Wenzel et al. |
| 10,678,227 B2 | 6/2020 | Przybylski et al. |
| 10,706,375 B2 | 7/2020 | Wenzel et al. |
| 10,726,711 B2 | 7/2020 | Subramanian et al. |
| 10,732,584 B2 | 8/2020 | Elbsat et al. |
| 10,767,885 B2 | 9/2020 | Przybylski et al. |
| 10,775,988 B2 | 9/2020 | Narain et al. |
| 10,796,554 B2 | 10/2020 | Vincent et al. |
| 10,809,682 B2 | 10/2020 | Patil et al. |
| 10,809,705 B2 | 10/2020 | Przybylski |
| 10,824,125 B2 | 11/2020 | Elbsat et al. |
| 10,854,194 B2 | 12/2020 | Park et al. |
| 10,871,298 B2 | 12/2020 | Ridder et al. |
| 10,876,754 B2 | 12/2020 | Wenzel et al. |
| 10,890,904 B2 | 1/2021 | Turney et al. |
| 10,900,686 B2 | 1/2021 | Willmott et al. |
| 10,901,446 B2 | 1/2021 | Nesler et al. |
| 10,909,642 B2 | 2/2021 | Elbsat et al. |
| 10,915,094 B2 | 2/2021 | Wenzel et al. |
| 10,917,740 B1 | 2/2021 | Scott et al. |
| 10,921,972 B2 | 2/2021 | Park et al. |
| 10,921,973 B2 | 2/2021 | Park et al. |
| 10,928,790 B2 | 2/2021 | Mueller et al. |
| 10,948,884 B2 | 3/2021 | Beaty et al. |
| 10,949,777 B2 | 3/2021 | Elbsat et al. |
| 10,955,800 B2 | 3/2021 | Burroughs et al. |
| 10,956,842 B2 | 3/2021 | Wenzel et al. |
| 10,962,945 B2 | 3/2021 | Park et al. |
| 10,969,135 B2 | 4/2021 | Willmott et al. |
| 11,002,457 B2 | 5/2021 | Turney et al. |
| 11,009,252 B2 | 5/2021 | Turney et al. |
| 11,010,846 B2 | 5/2021 | Elbsat et al. |
| 11,016,648 B2 | 5/2021 | Fala et al. |
| 11,016,998 B2 | 5/2021 | Park et al. |
| 11,022,947 B2 | 6/2021 | Elbsat et al. |
| 11,024,292 B2 | 6/2021 | Park et al. |
| 11,036,249 B2 | 6/2021 | Elbsat |
| 11,038,709 B2 | 6/2021 | Park et al. |
| 11,042,139 B2 | 6/2021 | Deshpande et al. |
| 11,042,924 B2 | 6/2021 | Asmus et al. |
| 11,061,424 B2 | 7/2021 | Elbsat et al. |
| 11,068,821 B2 | 7/2021 | Wenzel et al. |
| 11,070,389 B2 | 7/2021 | Schuster et al. |
| 11,073,976 B2 | 7/2021 | Park et al. |
| 11,080,289 B2 | 8/2021 | Park et al. |
| 11,080,426 B2 | 8/2021 | Park et al. |
| 11,086,276 B2 | 8/2021 | Wenzel et al. |
| 11,094,186 B2 | 8/2021 | Razak |
| 11,108,587 B2 | 8/2021 | Park et al. |
| 11,131,473 B2 | 8/2021 | Risbeck et al. |
| 11,113,295 B2 | 9/2021 | Park et al. |
| 11,119,458 B2 | 9/2021 | Asp et al. |
| 11,120,012 B2 | 9/2021 | Park et al. |
| 11,150,617 B2 | 10/2021 | Ploegert et al. |
| 11,151,983 B2 | 10/2021 | Park et al. |
| 11,156,996 B2 | 10/2021 | Schuster et al. |
| 11,158,306 B2 | 10/2021 | Park et al. |
| 11,182,047 B2 | 11/2021 | Nayak et al. |
| 11,195,401 B2 | 12/2021 | Pourmohammad |
| 11,217,087 B2 | 1/2022 | Pelski |
| 11,226,126 B2 | 1/2022 | Przybylski et al. |
| 11,243,523 B2 | 2/2022 | Llopis et al. |
| 11,268,715 B2 | 3/2022 | Park et al. |
| 11,268,996 B2 | 3/2022 | Vitullo et al. |
| 11,269,505 B2 | 3/2022 | Fala et al. |
| 11,272,011 B1 | 3/2022 | Laughton et al. |
| 11,272,316 B2 | 3/2022 | Scott et al. |
| 11,275,348 B2 | 3/2022 | Park et al. |
| 11,275,363 B2 | 3/2022 | Przybylski et al. |
| 11,281,169 B2 | 3/2022 | Chatterjee et al. |
| 11,288,754 B2 | 3/2022 | Elbsat et al. |
| 11,314,726 B2 | 4/2022 | Park et al. |
| 11,314,788 B2 | 4/2022 | Park et al. |
| 11,334,044 B2 | 5/2022 | Goyal |

(56) References Cited

U.S. PATENT DOCUMENTS

| | | |
|---|---|---|
| 11,353,834 B2 | 6/2022 | Mueller et al. |
| 11,356,292 B2 | 6/2022 | Ploegert et al. |
| 11,360,451 B2 | 6/2022 | Pancholi et al. |
| 11,361,123 B2 | 6/2022 | Ploegert et al. |
| 11,888,093 B2 | 1/2024 | Zhang et al. |
| 2002/0111698 A1 | 8/2002 | Graziano et al. |
| 2002/0130868 A1 | 9/2002 | Smith |
| 2003/0028269 A1 | 2/2003 | Spriggs et al. |
| 2003/0030637 A1 | 2/2003 | Grinstein et al. |
| 2003/0046862 A1 | 3/2003 | Wolf et al. |
| 2003/0071814 A1 | 4/2003 | Jou et al. |
| 2003/0078677 A1 | 4/2003 | Hull et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0001009 A1 | 1/2004 | Winings et al. |
| 2004/0064260 A1 | 4/2004 | Padmanabhan et al. |
| 2004/0143474 A1 | 7/2004 | Haeberle et al. |
| 2004/0153437 A1 | 8/2004 | Buchan |
| 2004/0168115 A1 | 8/2004 | Bauernschmidt et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0096797 A1* | 5/2005 | Matsubara ............... H02J 3/00 700/291 |
| 2005/0119767 A1 | 6/2005 | Kiwimagi et al. |
| 2005/0143863 A1 | 6/2005 | Ruane et al. |
| 2005/0267900 A1 | 12/2005 | Ahmed et al. |
| 2006/0004841 A1 | 1/2006 | Heikkonen et al. |
| 2006/0009862 A1 | 1/2006 | Imhof et al. |
| 2006/0017547 A1 | 1/2006 | Buckingham et al. |
| 2006/0020177 A1 | 1/2006 | Seo et al. |
| 2006/0028471 A1 | 2/2006 | Kincaid et al. |
| 2006/0029256 A1 | 2/2006 | Miyoshi et al. |
| 2006/0058900 A1 | 3/2006 | Johanson et al. |
| 2006/0067545 A1 | 3/2006 | Lewis et al. |
| 2006/0067546 A1 | 3/2006 | Lewis et al. |
| 2006/0077255 A1 | 4/2006 | Cheng |
| 2006/0184326 A1 | 8/2006 | McNally et al. |
| 2006/0206273 A1 | 9/2006 | Reichel et al. |
| 2006/0231568 A1 | 10/2006 | Lynn et al. |
| 2006/0265664 A1 | 11/2006 | Simons et al. |
| 2006/0279630 A1 | 12/2006 | Aggarwal et al. |
| 2007/0016955 A1 | 1/2007 | Goldberg et al. |
| 2007/0055757 A1 | 3/2007 | Mairs et al. |
| 2007/0055760 A1 | 3/2007 | McCoy et al. |
| 2007/0061046 A1 | 3/2007 | Mairs et al. |
| 2007/0067062 A1 | 3/2007 | Mairs et al. |
| 2007/0088534 A1 | 4/2007 | MacArthur et al. |
| 2007/0090951 A1 | 4/2007 | Chan et al. |
| 2007/0091091 A1 | 4/2007 | Gardiner et al. |
| 2007/0101433 A1 | 5/2007 | Louch et al. |
| 2007/0114295 A1 | 5/2007 | Jenkins |
| 2007/0120652 A1 | 5/2007 | Behnke |
| 2007/0139208 A1 | 6/2007 | Kates |
| 2007/0216682 A1 | 9/2007 | Navratil et al. |
| 2007/0219645 A1 | 9/2007 | Thomas et al. |
| 2007/0239484 A1 | 10/2007 | Arond et al. |
| 2007/0268122 A1 | 11/2007 | Kow et al. |
| 2008/0001763 A1 | 1/2008 | Raja et al. |
| 2008/0027885 A1 | 1/2008 | Van Putten et al. |
| 2008/0036593 A1 | 2/2008 | Rose-Pehrsson et al. |
| 2008/0062167 A1 | 3/2008 | Boggs et al. |
| 2008/0099045 A1 | 5/2008 | Glenn et al. |
| 2008/0103798 A1 | 5/2008 | Domenikos et al. |
| 2008/0120396 A1 | 5/2008 | Jayaram et al. |
| 2008/0144885 A1 | 6/2008 | Zucherman et al. |
| 2008/0183424 A1 | 7/2008 | Seem |
| 2008/0194009 A1 | 8/2008 | Marentis |
| 2008/0198231 A1 | 8/2008 | Ozdemir et al. |
| 2008/0209342 A1 | 8/2008 | Taylor et al. |
| 2008/0222565 A1 | 9/2008 | Taylor et al. |
| 2008/0224862 A1 | 9/2008 | Cirker |
| 2008/0242945 A1 | 10/2008 | Gugliotti et al. |
| 2008/0250800 A1 | 10/2008 | Wetzel |
| 2008/0277486 A1* | 11/2008 | Seem ................... H04L 67/125 236/49.3 |
| 2008/0279420 A1 | 11/2008 | Masticola et al. |
| 2008/0280275 A1 | 11/2008 | Collopy |
| 2008/0303658 A1 | 12/2008 | Melker et al. |
| 2008/0306985 A1 | 12/2008 | Murray et al. |
| 2008/0320552 A1 | 12/2008 | Kumar et al. |
| 2009/0001181 A1 | 1/2009 | Siddaramanna et al. |
| 2009/0024944 A1 | 1/2009 | Louch et al. |
| 2009/0065596 A1 | 3/2009 | Seem et al. |
| 2009/0083120 A1 | 3/2009 | Strichman et al. |
| 2009/0096791 A1 | 4/2009 | Abshear et al. |
| 2009/0125337 A1 | 5/2009 | Abri |
| 2009/0125825 A1 | 5/2009 | Rye et al. |
| 2009/0144023 A1 | 6/2009 | Seem |
| 2009/0157744 A1 | 6/2009 | McConnell |
| 2009/0160673 A1 | 6/2009 | Cirker |
| 2009/0322782 A1 | 12/2009 | Kimchi et al. |
| 2010/0048167 A1 | 2/2010 | Chow et al. |
| 2010/0058248 A1 | 3/2010 | Park |
| 2010/0064001 A1 | 3/2010 | Daily |
| 2010/0070089 A1 | 3/2010 | Harrod et al. |
| 2010/0073162 A1 | 3/2010 | Johnson et al. |
| 2010/0123560 A1 | 5/2010 | Nix et al. |
| 2010/0134296 A1 | 6/2010 | Hwang |
| 2010/0156628 A1 | 6/2010 | Ainsbury et al. |
| 2010/0156630 A1 | 6/2010 | Ainsbury |
| 2010/0188228 A1 | 7/2010 | Hyland |
| 2010/0223198 A1 | 9/2010 | Noureldin et al. |
| 2010/0249955 A1 | 9/2010 | Sitton |
| 2010/0286937 A1 | 11/2010 | Hedley et al. |
| 2010/0318200 A1 | 12/2010 | Foslien et al. |
| 2010/0324962 A1 | 12/2010 | Nesler et al. |
| 2011/0010654 A1 | 1/2011 | Raymond et al. |
| 2011/0057799 A1 | 3/2011 | Taneff |
| 2011/0077779 A1 | 3/2011 | Fuller et al. |
| 2011/0083094 A1 | 4/2011 | Laycock et al. |
| 2011/0087988 A1 | 4/2011 | Ray et al. |
| 2011/0112854 A1 | 5/2011 | Koch et al. |
| 2011/0126111 A1 | 5/2011 | Gill et al. |
| 2011/0154426 A1 | 6/2011 | Doser et al. |
| 2011/0161124 A1 | 6/2011 | Lappinga et al. |
| 2011/0169646 A1 | 7/2011 | Raichman |
| 2011/0184563 A1 | 7/2011 | Foslien et al. |
| 2011/0202467 A1 | 8/2011 | Hilber et al. |
| 2011/0253796 A1* | 10/2011 | Posa .................. G05D 23/1934 236/49.3 |
| 2011/0273298 A1 | 11/2011 | Snodgrass et al. |
| 2011/0291841 A1 | 12/2011 | Hollock et al. |
| 2011/0298301 A1 | 12/2011 | Wong et al. |
| 2011/0316703 A1 | 12/2011 | Butler et al. |
| 2011/0320054 A1 | 12/2011 | Brzezowski |
| 2012/0022700 A1 | 1/2012 | Drees et al. |
| 2012/0039503 A1 | 2/2012 | Chen et al. |
| 2012/0062382 A1 | 3/2012 | Taneff |
| 2012/0075464 A1 | 3/2012 | Derenne et al. |
| 2012/0109988 A1 | 5/2012 | Li et al. |
| 2012/0112883 A1 | 5/2012 | Wallace et al. |
| 2012/0131217 A1 | 5/2012 | Delorme et al. |
| 2012/0158185 A1 | 6/2012 | El-Mankabady et al. |
| 2012/0216243 A1 | 8/2012 | Gill et al. |
| 2012/0224057 A1 | 9/2012 | Gill et al. |
| 2012/0259466 A1 | 10/2012 | Ray et al. |
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |
| 2013/0091631 A1 | 4/2013 | Hayes et al. |
| 2013/0110295 A1 | 5/2013 | Zheng et al. |
| 2013/0169681 A1 | 7/2013 | Rasane et al. |
| 2013/0184880 A1 | 7/2013 | McMahon |
| 2013/0187775 A1 | 7/2013 | Marsden et al. |

(56) References Cited

U.S. PATENT DOCUMENTS

| | | |
|---|---|---|
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2013/0338837 A1 | 12/2013 | Hublou et al. |
| 2014/0032157 A1 | 1/2014 | Khiani |
| 2014/0040998 A1 | 2/2014 | Hsieh |
| 2014/0046490 A1 | 2/2014 | Foslien et al. |
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0277757 A1* | 9/2014 | Wang ............... F24F 11/46 700/276 |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316581 A1* | 10/2014 | Fadell ............... F24F 11/30 700/276 |
| 2014/0316582 A1 | 10/2014 | Berg-Sonne et al. |
| 2014/0320289 A1 | 10/2014 | Raichman |
| 2014/0342724 A1 | 11/2014 | Hill et al. |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0276237 A1* | 10/2015 | Daniels ............ G05D 23/1905 237/2 A |
| 2015/0281287 A1 | 10/2015 | Gill et al. |
| 2015/0323211 A1* | 11/2015 | Abiprojo ............ F24F 11/30 236/1 C |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0116181 A1 | 4/2016 | Aultman et al. |
| 2016/0139067 A1 | 5/2016 | Grace |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0327921 A1* | 11/2016 | Ribbich ............ F24F 11/30 |
| 2016/0328948 A1 | 11/2016 | Ferniany |
| 2016/0335731 A1 | 11/2016 | Hall |
| 2016/0367925 A1 | 12/2016 | Blackley |
| 2017/0024986 A1 | 1/2017 | Austin |
| 2017/0052518 A1* | 2/2017 | Wang ............... G05B 19/4183 |
| 2017/0193792 A1 | 7/2017 | Bermudez Rodriguez et al. |
| 2017/0256155 A1 | 9/2017 | Sengstaken, Jr. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0151054 A1 | 5/2018 | Pi |
| 2018/0172309 A1 | 6/2018 | Niikura |
| 2018/0218591 A1 | 8/2018 | Easter |
| 2018/0259927 A1 | 9/2018 | Przybylski et al. |
| 2018/0266718 A1* | 9/2018 | Gillette ............ F24F 11/64 |
| 2018/0293038 A1 | 10/2018 | Meruva et al. |
| 2018/0301014 A1 | 10/2018 | Worral et al. |
| 2018/0313695 A1 | 11/2018 | Shim et al. |
| 2018/0365957 A1 | 12/2018 | Wright et al. |
| 2019/0051138 A1 | 2/2019 | Easter |
| 2019/0139395 A1 | 5/2019 | Rogachev et al. |
| 2019/0209719 A1 | 7/2019 | Andersen et al. |
| 2020/0009280 A1 | 1/2020 | Kupa et al. |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0200420 A1 | 6/2020 | Nayak et al. |
| 2021/0010701 A1 | 1/2021 | Suindykov et al. |
| 2021/0011443 A1 | 1/2021 | Mcnamara et al. |
| 2021/0011444 A1 | 1/2021 | Risbeck et al. |
| 2021/0364181 A1 | 11/2021 | Risbeck et al. |
| 2021/0373519 A1 | 12/2021 | Risbeck et al. |
| 2022/0011731 A1 | 1/2022 | Risbeck et al. |
| 2022/0113045 A1 | 4/2022 | Gamroth et al. |
| 2022/0137580 A1 | 5/2022 | Burroughs et al. |

FOREIGN PATENT DOCUMENTS

| | | | |
|---|---|---|---|
| CN | 103110410 A | | 5/2013 |
| CN | 103970977 A | | 8/2014 |
| CN | 105116848 A | | 12/2015 |
| CN | 105824796 A | * | 8/2016 |
| CN | 108961714 A | | 12/2018 |
| CN | 110009245 A | | 7/2019 |
| CN | 110084928 A | | 8/2019 |
| CN | 110827457 A | | 2/2020 |
| EP | 1669912 A1 | | 6/2006 |
| EP | 2310981 A1 | | 4/2011 |
| JP | 7085166 A | | 3/1995 |
| JP | 11024735 A | | 1/1999 |
| JP | 11317936 A | | 11/1999 |
| JP | 2001356813 A | | 12/2001 |
| JP | 2005242531 A | | 9/2005 |
| JP | 2005311563 A | | 11/2005 |
| KR | 1172747 B1 | | 8/2012 |
| KR | 101445367 B1 | | 10/2014 |
| KR | 1499081 B1 | | 3/2015 |
| WO | 9621264 A3 | | 11/1996 |
| WO | 2004029518 A1 | | 4/2004 |
| WO | 2005045715 A2 | | 5/2005 |
| WO | 2008152433 A1 | | 12/2008 |
| WO | 2008157755 A1 | | 12/2008 |
| WO | 2009012319 A2 | | 1/2009 |
| WO | 2009079648 A1 | | 6/2009 |
| WO | 2010106474 A1 | | 9/2010 |
| WO | 2011025085 A1 | | 3/2011 |
| WO | 2011043732 A1 | | 4/2011 |
| WO | 2011057173 A2 | | 5/2011 |
| WO | 2011123743 A1 | | 10/2011 |
| WO | 2013062725 A1 | | 5/2013 |
| WO | 2013178819 A1 | | 12/2013 |
| WO | 2014009291 A1 | | 1/2014 |
| WO | 2014098861 A1 | | 6/2014 |
| WO | 2014135517 A1 | | 9/2014 |
| WO | 2016123536 A1 | | 8/2016 |
| WO | 2017057274 A1 | | 4/2017 |
| WO | 2019046580 A1 | | 3/2019 |
| WO | 2020024553 A1 | | 2/2020 |

OTHER PUBLICATIONS

Johnson Controls and Microsoft Announce Global Collaboration, Launch Integration between Open Blue Digital Twin and Azure Digital Twins, 7 pages, 2022. Accessed Aug. 29, 2022.

Open Blue Companion Desktop User Guide, Johnson Controls, 18 pages, 2022.

Open Blue Digital Twin:Designed for Buildings. Infused with AI, Johnson Controls, 17 pages, 2022. Accessed Aug. 29, 2022.

Open Blue Enterprise Manager User Guide, Johnson Controls, Release 3.1, 72 pages, Jan. 28, 2021.

Open Blue Enterprise Manager User Guide, Johnson Controls, Release 4.0, 78pages, Nov. 29, 2021.

Open Blue Location Manager User Guide, Johnson Controls, Release 2.4.7, 28 pages, Jul. 20, 2022.

(56) References Cited

OTHER PUBLICATIONS

Open Blue Enterprise Manager, Optimize Building Portfolio Performance with Advanced Data Analytics and AI, Johnson Controls, 20 pages, Accessed Aug. 29, 2022.
Open Blue Platform, Make Smarter, Faster, More Data-Driven Decisions, Johnson Controls, 15 pages, 2022. Accessed Aug. 29, 2022.
Open Blue, Now, Spaces have Memory and Identity, Johnson Controls, 20 pages, 2022. Accessed Feb. 10, 2022.
Open Blue Enterprise Manager User Guide, Johnson Controls, 108 pages, Release 4.1.3, 2022, Accessed Aug. 29, 2022.
Risbeck et al; "Modeling and Multiobjective Optimization of Indoor Airborne Disease Transmission Risk and Associated Energy Consumption for Building HVAC Systems," Energy and Buildings, vol. 253, 24 pages, 2021.
Sinha et al; "Balance Infection Risk, Sustainability and Comfort with Open Blue," Johnson Controls, 2 pages, 2021.
"Energy Manager User Guide," Release 3.2, Honeywell, 180 pages, 2008.
"Fuzzy Logic Toolbox 2.1, Design and Stimulate Fuzzy Logic Systems," The MathWorks, 2 pages, May 2004.
"Nunk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls World, 4 pages, Spring 1997.
Bell, Michael B. et al., "Early Event Detection-Results from A Prototype Implementation," AICHE Spring National Meeting, 15 pages, Apr. 2005.
CADGRAPHICS, "The CADGRAPHICS User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chen, Tony. F., "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Published Australian Application 2009904740, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.

Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
http://pueblo.lbl.gov/~olken . . . , "Remote Building Monitoring and Operations Home Page," 5 pages, prior to Aug. 27, 2007.
http://www.commercial.carrier.com/commercial/hvac/productdescription . . . , "Carrier: i-Vu CCN," 1 page, printed Mar. 11, 2008.
http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.
http://www.docs.hvacpartners.com/idc/groups/public/documents/techlit/gs-controls-ivucon.rtf, "Products," 5 pages, printed Jul. 3, 2007.
http://www.lightstat.com/products/istat.asp, Lightstat Incorporated, "Internet Programmable Communicating Thermostats," 1 page, printed Mar. 13, 2007.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights On A Wireless Lighting Control System," 11 pages, printed Mar. 22, 2007.
I.Lon 100e3 Internet Server, 1 page, prior to Aug. 27, 2007.
I.Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Jeffrey Ball, "Green Goal of 'Carbon Neutrality' Hits Limit," TheWall Street Journal, 7 pages, Dec. 30, 2008.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Kourti, Theodora, "Process Analysis and Abnormal Situation Detection: From Theory to Practice," IEEE Control Systems Magazine, p. 10-25, Oct. 2002.
Mathew, Paul A., "Action-Oriented Benchmarking, Using CEUS Date to Identify and Prioritize Efficiency Opportunities in California Commercial Buildings," 26 pages, Jun. 2007.
Morrison, Don et al., "The Early Event Detection Toolkit," Honeywell Process Solutions, 14 pages, Jan. 2006.
Narang, "WEBARC: Control and Monitoring of Building Systems Over the Web," 53 pages, May 1999.
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Richard Rogan et al., "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.

(56) References Cited

OTHER PUBLICATIONS

Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Thermal Imaging SmartPhone Can Be used For Temperature Screening of People," CAT, 3 pages, accessed Jul. 13, 2020.
"Contact Tracing Now Available on Identiv's Hirsch Velocity Access Control Platform," IDENTIV, 5 pages, May 21, 2020.
Silva et al., "Cough localization for the detection of respiratory diseases in pig houses," ScienceDirect, 7 pages, May 28, 2008.
Oey et al., "Evaluation of Isolation Compliance Using Real Time Video In Critical Care," North Shore University Hospital, 1 page, Oct. 9, 2015.
"Facial Attendace System With Temperature Screening Now In India," IANS, 5 pages, Mar. 19, 2020.
"Plan to Re-Open," EHIGH, 16 pages, accessed Jun. 13, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
"INNCONTROL 5," Honeywell, 2 pages, Aug. 8, 2018.
"IP Door Access Control," KINTRONICS, 21 pages, 2014.
"Kogniz AI Health Response Platform," Kogniz, 9 pages, accessed May 21, 2020.
"Machine Learning Could Check If You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
"NEC launches dual face biometric and fever detection system for access control," Biometric Update, 4 pages, May 8, 2020.
"Remote temperature monitoring," AXIS Communication, 10 pages, 2014.
"FebriEye-AI Based Thermal Temperature Screening System," vehant, 1 page, 2020.
"See The World In A New Way Hikvision Thermal Cameras," Hikvision, 12 pages, 2017.
Allain, "Trying out the iPhone Infrared Camera: The FLIR One," WIRED, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," Yourstory, 7 pages, Mar. 31, 2020.
Juliana Bocicor et al. "Wireless Sensor Network based System for the Prevention of Hospital Acquired Infections", arxiv.org, Cornell University Ithaca, NY 14853, May 2, 2017, XP080947042, (Abstract).
Shhedi Zaid Ali et al., "Traditional and ICT Solutions for Preventing the Hospital Acquired Infection", 2015 20th International Conference on Control Systems and Computer Science, IEEE, May 27, 2015, pp. 867-873, XP033188038.
Extended European Search Report, EP application No. 20151295.1, pp. 13, May 26, 2020.
U.S. Appl. No. 14/109,496, filed Dec. 17, 2013.
www.geappliances.com/home-energy-manager/about-energy-monitors.htm, "Energy Monitor, Home Energy Monitors, GE Nucleus," 2 pages, printed Jan. 15, 2013.
www.luciddesigngroup.com/network/apps.php#/homepage, "Lucid Design Group—Building Dashboard Network—Apps," 7 pages, Jan. 15, 2013.
Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," 7 pages, prior to Jul. 24, 2014.
"4.0 Today's Activities, The Home Dashboard," CRBM info@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
e-homecontrols.com, "e-Home Controls Website," link to actual website no longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Instituto Superior Tecnico, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
"WEBs-AX Web-Enabled Building Solutions," sales brochure, Honeywell International Inc., Mar. 2009.
"Attune Advisory Services," press release, Honeywell International Inc., Mar. 20, 2012.
EnteliWEB product from Delta Controls, web pages retrieved on May 9, 2013 from http://deltacontrols.com/products/facilities-management/supervisory-software et seq. by the Internet Archive at web.archive.org.
"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB catalog sheet, Delta Controls, Inc., 2012.
EnteliWEB catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.
"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"NiagraAX Product Model Overview," Tridium, Inc., 2005.
"An Overview of NiagraAX: A comprehensive software platform designed to create smart device applications," Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.

(56) References Cited

OTHER PUBLICATIONS

Sinha et al., "9 Key attributes of energy dashboards and analytics tools," https://www.greenbiz.com/blog/2013/08/28/9-key-attributes-energy-dashboards-and=analytics-tools, Aug. 28, 2013.
Sinopoli, "Dashboards For Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
Search Report and Written Opinion from related International PCT Application No. PCT/US2018/025189 dated Jul. 17, 2018 (12 pages).
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
AU Examination Report No. 1, Australian Patent Office, AU Application No. 2021232785, Sep. 30, 2022 (6 pages).

\* cited by examiner

Fig. 5

PROVIDING A COMFORT DASHBOARD

PRIORITY INFORMATION

This is a continuation of co-pending U.S. patent application Ser. No. 15/941,952, filed Mar. 30, 2018, which claims the benefit of U.S. Provisional Application No. 62/480,047, filed Mar. 31, 2017, both of which are incorporated herein by reference.

TECHNICAL FIELD

The present disclosure relates to providing a comfort dashboard.

BACKGROUND

Facilities (e.g., buildings, departments, warehouses, plants, factories, refineries, airports, laboratories, etc.) can have various systems configured to provide human comfort (e.g., thermal comfort). Such systems can be and/or include, for example, heating, ventilation, and air conditioning (HVAC) systems and/or energy management systems, among other types of systems.

Previous approaches to providing comfort may lack key performance indicators (KPIs) that indicate (e.g., measure, evaluate, etc.) the efficacy of a comfort provision system. For instance, previous approaches may inform managers or decision-makers about energy usage and/or energy savings, but may lack information regarding the extent to which comfort is actually being provided in the facility. Furthermore, previous approaches may rely on reports that are manually created and/or out-of-date upon their creation. Such reports may additionally lack helpful interpretations and/or summarizations of a large amount of data.

BRIEF DESCRIPTION OF THE DRAWINGS

FIG. 5 illustrates another display including a number of widgets of a comfort dashboard in accordance with one or more embodiments of the present disclosure.

DETAILED DESCRIPTION

Figure 1:
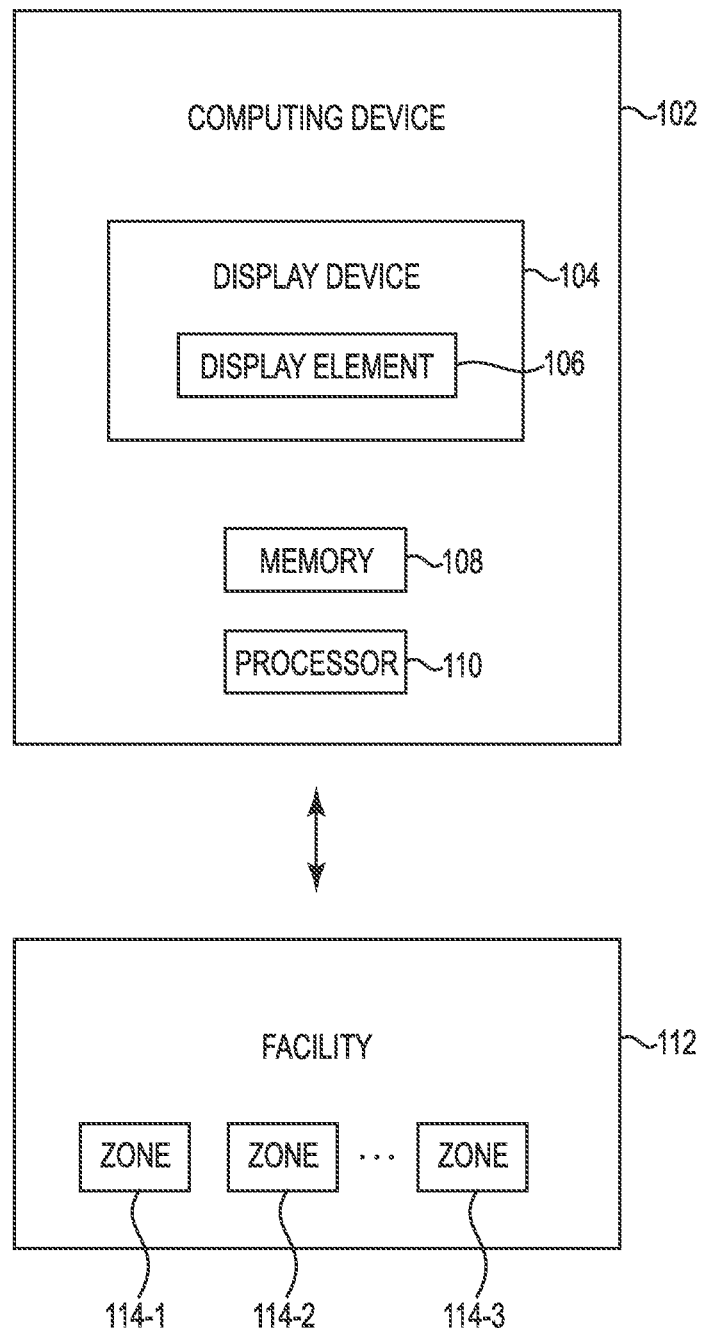
FIG. 1 illustrates a system for providing a comfort dashboard in accordance with one or more embodiments of the present disclosure.

Methods, systems, and computer-readable media for providing a comfort dashboard are described herein. For example, one or more embodiments include receiving operational data associated with an HVAC system of a facility, receiving credentials associated with a user of a user device including a number of display elements configurable by the user, and determining a particular portion of the operational data to provide to the user via the display elements of the user device based, at least in part, on the credentials.

Various embodiments of the present disclosure provide for a unified interest layer (referred to herein as a "dashboard") allowing at-a-glance views of various aspects (e.g., performance indicators, statistics, analytics, and/or metrics) associated with an operational (e.g., working) system. Systems, as used herein, refers to systems configured to provide human comfort. Such systems include, for example, HVAC systems. In a general sense, dashboards of the present disclosure can display data associated with the various aspects of such systems (herein referred to as "information" in and/or as summaries, trends, comparisons, and/or exceptions, among other ways of displaying information.

Whereas previous approaches may inform users as to energy savings of HVAC equipment, embodiments herein can additionally or alternatively provide meaningful insights into the actual comfort being provided in a facility. In an example, HVAC equipment may be simultaneously heating and cooling a particular space (e.g., room) of a facility due to a failed sensor. While previous approaches may indicate an elevated energy usage due to the simultaneous heating and cooling, they may fail to provide any indication that comfort is not being provided because a desired temperature (e.g., setpoint) is not being maintained. Embodiments of the present disclosure can provide such information in real-time, for instance.

Though not limited to such scenarios, embodiments of the present disclosure may be beneficial in instances where an entity (e.g., comfort provider) is hired to provide comfort to a customer. For instance, a facility may contract out the installation and/or maintenance of its HVAC system(s) to an outside entity. Providers enabled with embodiments herein can demonstrate performance results immediately, thereby providing quality assurance and transparency to their customers.

Dashboards in accordance with embodiments herein can provide indications of whether a facility (or a subset of a facility) is below a lower temperature threshold (e.g., too cold), within a temperature range (e.g., comfortable), and/or above an upper temperature threshold (e.g., too hot). Further, embodiments herein can track such information across hours, days, months, and/or years to provide different, meaningful, and easy-to-digest trends, patterns, and areas of interest. Users may readily understand which parts of a facility may need attention, maintenance, and/or reduction(s) thereof. As a result, cost savings may be realized while the provision of comfort across the facility is improved.

Embodiments of the present disclosure can receive (e.g., gather) data from a number of systems and/or devices and display information in various displays, determined based on an identity and/or role of a user, for instance. In some embodiments, information can be displayed based on one or more preferences of a user. In some embodiments, information can be displayed based on one or more user inputs.

Embodiments of the present disclosure can display a dashboard on various user devices including, by way of example and not limitation, desktop computers, laptop computers, tablets, smart phones, and/or personal digital assistants (PDAs), for instance. Further, embodiments of the present disclosure can display dashboards on various computing and/or device platforms (e.g., operating systems).

Accordingly, embodiments of the present disclosure can provide various users (e.g., operators, managers, maintenance personnel, etc.) easily viewable and easily understandable information associated with the various systems described herein. Such users can use the provided information to make more informed and/or higher-level decisions than by using previous approaches. For example, managers can use such information to make decisions regarding contracts, purchases, and maintenance, among other decisions.

Dashboards in accordance with one or more embodiments of the present disclosure can include a number of display elements, sometimes referred to herein as "widgets." Widgets in accordance with embodiments of the present disclosure can include software accessories for providing (e.g., displaying) various information associated with various aspects of systems such as those previously discussed. Widgets in accordance with embodiments herein can provide different key performance indicators of the provision of comfort in a facility.

Widgets can interact with remote sources of information, such as servers (e.g., computing device 102 discussed below in connection with FIG. 1), to provide information. Widgets can be used to access various pages (e.g., html webpages). Widgets can be interactive, so that a user performs common input operations (e.g., clicking a mouse, typing on a keyboard, touching a screen) to utilize the functionality of a widget.

Dashboards (e.g., widgets of a dashboard) in accordance with one or more embodiments of the present disclosure can be user-configurable. A user can interact with and/or configure widgets as desired, for instance. In some embodiments, a user can move widgets around the display, and/or can resize widgets if applicable. In various embodiments, some widgets may be resizable, and some may be of fixed size. Some widgets can automatically resize themselves based on the amount or nature of the information being displayed.

In some embodiments, widgets may overlap one another. In some embodiments, widgets do not overlap one another; if a user attempts to move one widget to the position occupied by another widget, one of the widgets may automatically move out of the way to make room.

In various embodiments, position(s), configuration(s), and/or size(s) of widgets can be saved when the dashboard is dismissed, so that the same state can be restored the next time the dashboard is invoked. Various embodiments allow a user to manipulate, adjust, and/or otherwise personalize particular information included in dashboards and/or widgets in accordance with the present disclosure.

Personalization of displayed information may be determined and/or limited by a user's role (e.g., identity). For example, a high-level user (e.g., a manager) may desire higher-level summarized information (e.g., summarized monthly). Higher-level information can include, for example, monthly spending associated with an HVAC system. A lower-level user (e.g., a maintenance worker) may desire lower-level information (e.g., current and/or real-time information). Lower-level information can include, for example, current temperatures of facility zones and/or HVAC devices that may be malfunctioning.

Display of information to a particular user can therefore be determined based on a role of the user. The role can be determined based upon user input of credentials and/or authentication information (e.g., log in).

Dashboards can be overlaid on an existing desktop user interface of a user device, for instance. The user interface can be darkened, brightened, blurred, distorted, or otherwise altered so as to emphasize that it is temporarily inactivated. The existing desktop can be visible behind the dashboard. In some embodiments, the existing desktop is not visible while the dashboard is active. In some embodiments, the desktop can be shrunk to a small portion of the screen while the dashboard is active, and can be reactivated by various user inputs.

A number of embodiments of the present disclosure can include the capability to alert a user when a widget needs attention or has new information to display to the user, even if the dashboard is not currently active. For example, if a particular portion of comfort data (e.g., proportion of time a zone is "too hot" per week) exceeds a particular threshold (e.g., 80 percent) a user may be alerted. A distinctive sound can be played, a dialog box can be presented, and/or a text alert can be displayed. Such alerts can be of a generalized type, may indicate the specific widget that issued the alert, and/or can display additional information specifying the nature of the alert. The user can then activate the dashboard to see the widget that issued the alert, for instance. Alternatively, the dashboard can automatically be activated in such a situation, or a dialog box can be presented to allow the user to indicate whether or not the dashboard should be activated.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 206 may reference element "06" in FIG. 1, and a similar element may be referenced as 306 in FIG. 3. Multiple analogous elements within one figure may be referenced with a reference numeral followed by a hyphen and another numeral or a letter. For example, 206-1 may reference element 06-1 in FIGS. 2 and 206-2 may reference element 06-2, which can be analogous to element 06-1. Such analogous elements may be generally referenced without the hyphen and extra numeral or letter. For example, elements 206-1 and 206-2 may be generally referenced as 206.

As will be appreciated, elements shown in the various embodiments herein can be added, exchanged, and/or eliminated so as to provide a number of additional embodiments of the present disclosure. As used herein, "a" or "a number of" something can refer to one or more such things. For example, "a number of widgets" can refer to one or more widgets. In addition, as will be appreciated, the proportion and the relative scale of the elements provided in the figures are intended to illustrate the embodiments of the present invention, and should not be taken in a limiting sense.

For purposes of illustration, various embodiments are herein described in the context of a particular operational system (e.g., an HVAC system). As will be appreciated, and as is previously discussed, embodiments of the present disclosure do not limit systems and/or dashboards to a particular type, and such examples are not to be taken in a limiting sense.

FIG. 1 illustrates a system for providing a comfort dashboard in accordance with one or more embodiments of the present disclosure. As shown in FIG. 1, the system includes a computing device 102 in communication with a facility 112. The computing device 102 and the facility 112 (e.g., devices and/or systems of the facility 112) can be connected via a wired and/or wireless connection, such as a network, for instance, to allow data to be transferred in any direction between the computing device 102, and the facility 112. The network can be the Internet and/or a private network belonging to an entity, for example. The entity can be defined as an individual, group of individuals, and/or a business.

The facility 112 can be or include one or more buildings, departments, warehouses, plants, factories, refineries, airports, laboratories, mines, etc. The facility 112 can include a plurality of zones, illustrated in FIG. 1 as a zone 114-1, a zone 114-2, and a zone 114-N. Facilities herein are not limited to a particular number of zones 114. Zones 114 may refer to subsets of the facility 112. Zones 114 may be of same, similar, or different sizes. For instance, in some embodiments, zones 114 may be rooms, wings, floors, departments, buildings, etc.

As shown in FIG. 1, computing device 102 includes a processor 110 and a memory 108. Memory 108 can be coupled to processor 110. Memory 108 can be volatile or nonvolatile memory. Memory 108 can also be removable (e.g., portable) memory, or non-removable (e.g., internal) memory. For example, memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 108 is illustrated as being located in computing device 102, embodiments of the present disclosure are not so limited. For example, memory 108 can also be located internal to another computing resource (e.g., enabling computer readable instructions to be downloaded over the Internet or another wired or wireless connection). Memory 108 can also store executable instructions, such as, for example, computer readable instructions (e.g., software), for providing a comfort dashboard according one or more embodiments of the present disclosure.

Computing device 102 can be various devices capable of displaying a comfort dashboard in accordance with embodiments of the present disclosure (e.g., a desktop computer, laptop computer, tablet, smart phone, and/or personal digital assistant (PDAs), for instance, among others). In some embodiments, the dashboard can be available to a user from a remote location (e.g., via display device 104, discussed below). Configuration information for the user's dashboard can be stored at a remote server (e.g., the computing device 102, in some embodiments, discussed below), pursuant to a user command or automatically. The user can then enter credentials and/or authentication information (e.g., log in) and be presented with a display 104, for instance.

In some embodiments, computing device 102 includes the display 104. In some embodiments, the display 104 can be a portion of a device separate from the computing device 102 and may be alternatively referred to as a display device 104. Display 104 can be a graphic user interface (GUI) that can provide (e.g., display and/or present) and/or receive information (e.g., data and/or images) to and/or from a user. For example, display 104 can include a screen that can provide information to a user and/or receive information entered into display 104 by the user. However, embodiments of the present disclosure are not limited to a particular type of display.

Display 104 can be analogous to display 216, 318, 420, 522, 624, 726, 828, and/or 930 discussed below in connection with FIGS. 2-9, respectively, for instance. As shown in FIG. 1, display 104 includes a display element 106. Display element 106 can be analogous to one or more of the display elements 206, 306, 406, 506, 706, 806, and/or 906 discussed below in connection with FIGS. 2-9, respectively, for instance. Though a single display 104 and display element 106 are shown in FIG. 1, embodiments of the present disclosure are not so limited and reference to a single display element is not to be taken in a limiting sense.

In some embodiments, display element 106 can be pre-installed on computing device 102 or display device 104 (e.g., in memory 108). In other embodiments, display element 106 is not preinstalled, but can be installed in response to various user input(s). In various embodiments, a user can download display element 106 onto display 104 from a repository associated with and/or maintained by computing device 102, for instance. Such a download (e.g., installation) can be and/or be a portion of a fully functional application containing related functionality (e.g., additional display elements).

Computing device 102 (e.g., processor 110 of computing device 102) can be configured to perform various tasks in accordance with embodiments herein. For instance, processor 110 can execute the executable instructions stored in memory 108 to receive operational data associated with an HVAC system of the facility 112. Such data can be received from sensors, actuators, controllers, programmable communicating thermostats (PCTs), and/or other devices. In some embodiments, for instance, operational data can be received from edge devices such as temperature sensors. In some embodiments, operational data can be received from a building management system (BMS) associated with the facility 112.

In some embodiments, computing device 102 can provide (e.g., transmit) a portion of the operational data responsive to a request (e.g., a request, as discussed below, made by display device 104). Computing device 102 can include an Application Programming Interface (API), for instance, associated with display element 106. The API can gather a particular portion of operational data received from the facility 112 configured to be displayed as information by display element 106. A particular portion of operational data can refer to operational data from a particular time period (e.g., a particular time instance, hour, day, month, year, etc.), and/or operational data associated with a particular aspect of the facility 112 (e.g., occupancy data) or an HVAC system of the facility 112, such as configuration settings, setpoints, temperature data, humidity data, sunlight data, etc.

Additionally, computing device 102 can include a number of APIs, each associated with a respective display element 106 of display 104. Where appropriate, authentication and/or user verification may be required before computing device 102 provides requested data. The information can be transmitted across a secure channel and/or encrypted prior to transmission, according to various techniques.

Providing operational data can be in response to a determination that display device 104 is connected (e.g., wired and/or wirelessly connected) to computing device 102. As such, operational data can be updated upon subsequent reconnection if the connection is lost. Operational data can be updated responsive to user inputs and/or according to a schedule, for instance. Operational data can be provided along with an indicator associated with a time it was provided (e.g., a time stamp), for instance. Such an indicator can be produced and/or displayed by display 104 (e.g., by display element 106) in association with received data.

Processor 110 can execute the executable instructions stored in memory 108 to receive credentials associated with a user of a user device including a number of display elements configurable by the user. For instance, the user can enter credentials and/or authentication information (e.g., log in) from a display device 104 and/or computing device 102. Processor 110 can execute the executable instructions stored in memory 108 to determine a particular portion of the operational data to provide to the user via the display elements of the user device based, at least in part, on the credentials. Different portions of operational data displayed via display elements are illustrated in FIGS. 2-9 and discussed below. In some embodiments, the operational data displayed is summarized via the display element 106. Displaying a summary of a portion of the data can include agglomerating the 106 (e.g., converting the data to information displayed by display element 106).

Computing device 102 can store dashboard configuration information. Dashboard configuration information can be used by computing device 102 and/or display 104 to specify the configuration options for displaying display element 106. Dashboard configuration information can include display detail configuration levels and the like based on roles.

Figure 2:
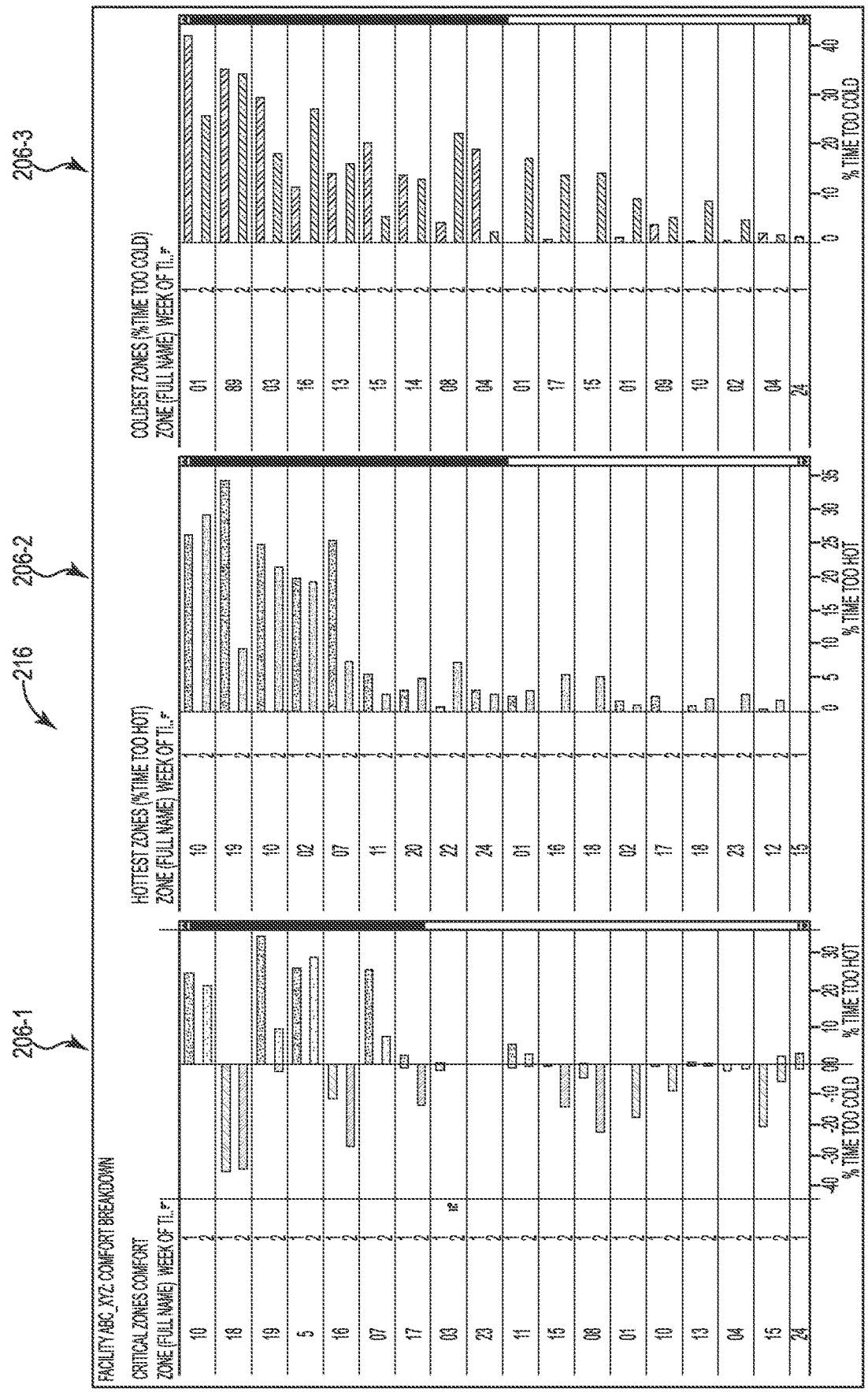
FIG. 2 illustrates a display including a number of widgets of a comfort dashboard in accordance with one or more embodiments of the present disclosure.

FIG. 2 illustrates a display 216 including a number of widgets 206 of a comfort dashboard in accordance with one or more embodiments of the present disclosure. As shown, widgets herein can display information in various manners. Information can be displayed via charts, graphs, text, images, icons, trends, symbols, etc. Widgets can allow a user to visualize increased and/or decreased levels of information detail via various inputs (e.g., touching particular portions of widgets).

Widgets can interact with various functionalities of computing device 102. Such functionalities can include image capturing functionalities (e.g., a camera) and/or location functionalities (e.g., using Global Positioning System (GPS) technology), for instance. In an example, a user may be navigating a particular portion of a facility. The user can activate a GPS functionality of the computing device 102 such that, via one or more of widgets 206, the user can visualize comfort statuses in zone(s) of the facility within a particular distance from the user's geographical location (e.g., a particular area having a radius of 20 meters). Such information can allow the user to make various decisions such as, for example, a decision to perform maintenance within the area.

Widgets can form a request for data, and transmit the request according to HTTP or some other network protocol. A computing device, (e.g., computing device 102) can respond to the request with information; and the widgets can use the information in forming the output that will be displayed. For example, such operations can take place in response to JavaScript code within widgets.

As illustrated in FIG. 2, display 216 includes critical zones comfort widget 206-1, a hottest zones widget 206-2, and a coldest zones widget 206-3. As will be appreciated, embodiments of the present disclosure do not limit the number, names and/or appearance of widgets to those illustrated by the Figures herein.

In some embodiments, a user can indicate, via input, a subset of particular zones which may be deemed "critical zones." Such zones may include zones where human occupancy is high and/or likely. Such zones may include zones wherein comfortable conditions are particularly desired. The critical zones comfort widget 206-1 can display each of these critical zones along with a percentage of time they were above an upper temperature threshold (e.g., too hot) and below a lower temperature threshold (e.g., too cold). A time period for such display can be automatically determined and/or selected by the user. Two weeks is shown in FIG. 2, for example (week 24 and week 25). Similarly, the upper and/or lower thresholds can be determined statistically (e.g., based on numerical differences and/or standard deviations from setpoint) or by user input.

The hottest zones widget 206-2 can display the zones of the facility having the greatest proportion of time wherein the temperature was above the upper threshold. These zones may call for special attention and/or maintenance, for instance. Similarly, the coldest zones widget 206-3 can display the zones having the greatest proportion of time wherein the temperature was below the lower threshold.

Figure 3:
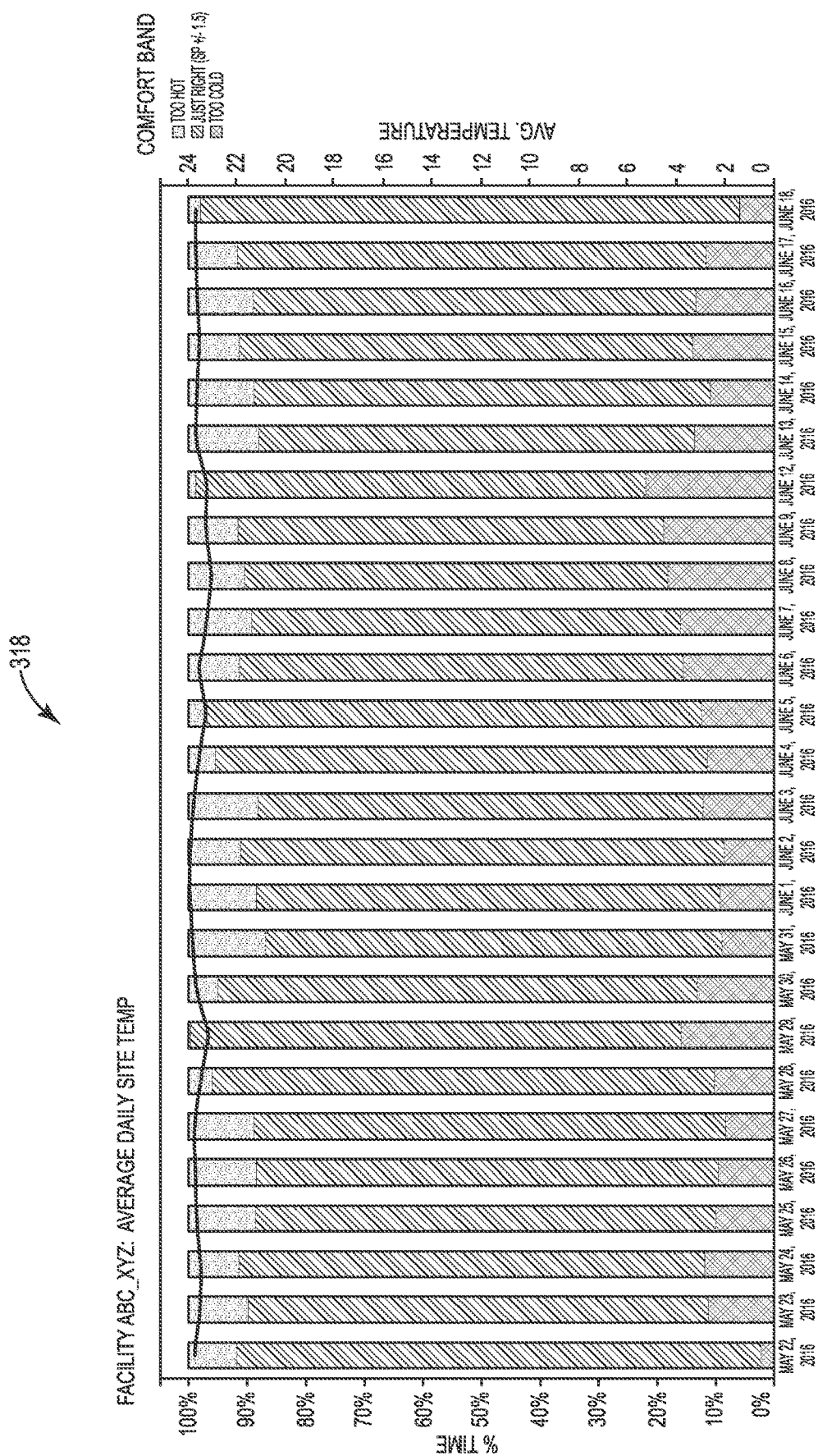
FIG. 3 illustrates another display including a number of widgets of a comfort dashboard in accordance with one or more embodiments of the present disclosure.

FIG. 3 illustrates a display 318 including a number of widgets 306-4 of a comfort dashboard in accordance with one or more embodiments of the present disclosure. The overview widget 306-4 can display a percentage of time comfort in the facility was within a desired range (e.g., below upper threshold and above lower threshold), too hot, and too cold for a period of time (a month, in the example of FIG. 3). Additionally, the overview widget 306-4 can illustrate a trend line indicating outside air temperature. Such a trend line can allow a user to readily visualize and understand what effect external conditions may have on the provision of comfort in the facility.

Figure 4:
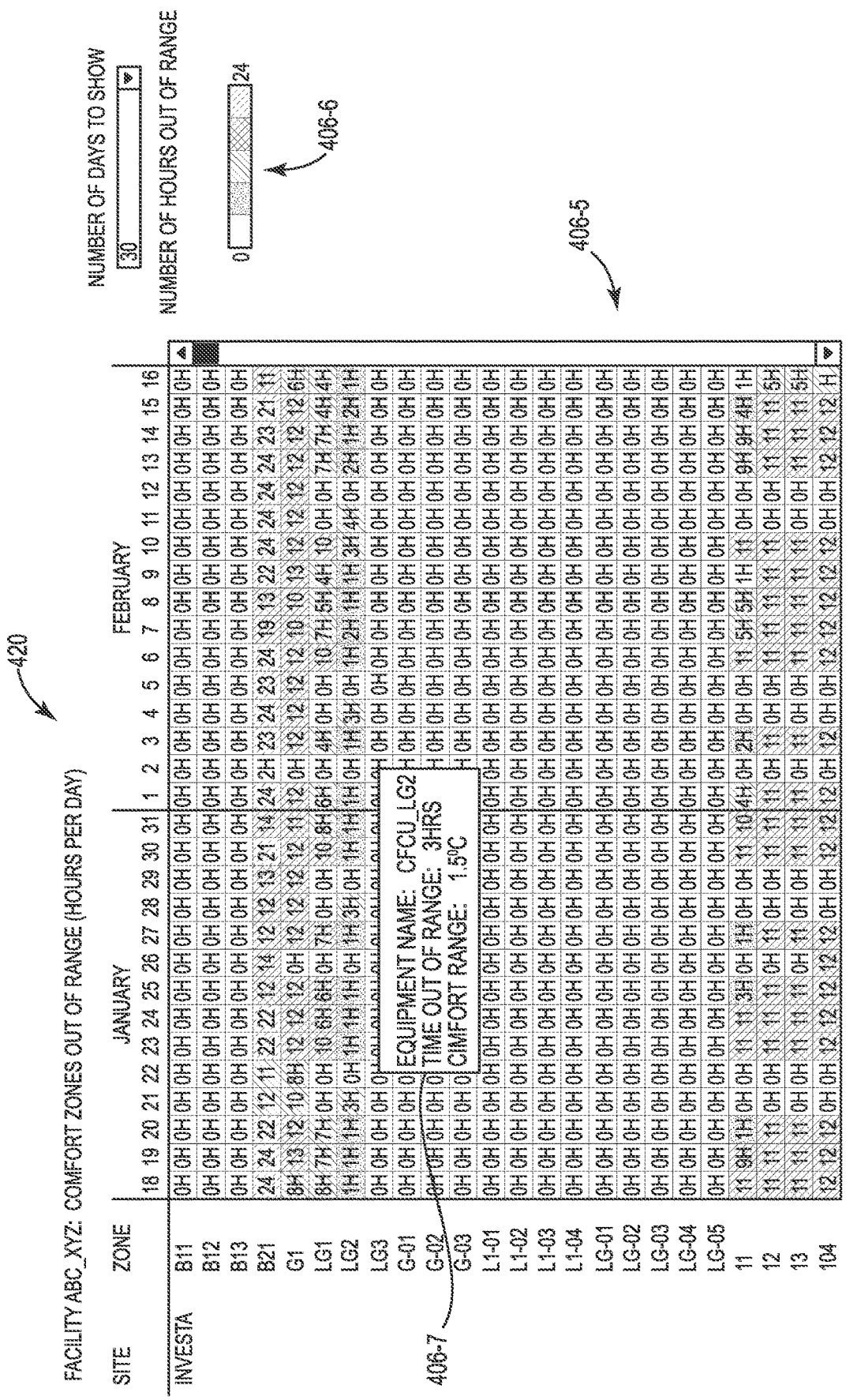
FIG. 4 illustrates another display including a number of widgets of a comfort dashboard in accordance with one or more embodiments of the present disclosure.

FIG. 4 illustrates a display 420 including a number of widgets 406-5, 406-6, and 406-7 of a comfort dashboard in accordance with one or more embodiments of the present disclosure. The out of range widget 406-5 can display zone temperatures that are outside a desired (e.g., acceptable range) for a period of time. The intensity of the coloration can, for instance, indicate how much time (how many hours) the average temperature has been outside of the desired setpoint range. It is noted that embodiments herein are not limited to color variations to indicate such distinctions. A display settings widget 406-6 can be provided to allow user modification of the time period and/or the display coloration, for instance.

Selecting or hovering over a particular cell of the widget 406-5 corresponding to a zone and day can generate a details widget 406-7. The details widget 406-7 can display a name of a device or component (e.g., thermostat and/or controller) assigned to a particular zone, the time the zone has been out of the desired range, and the value of the range (e.g., from setpoint value).

Figure 5:
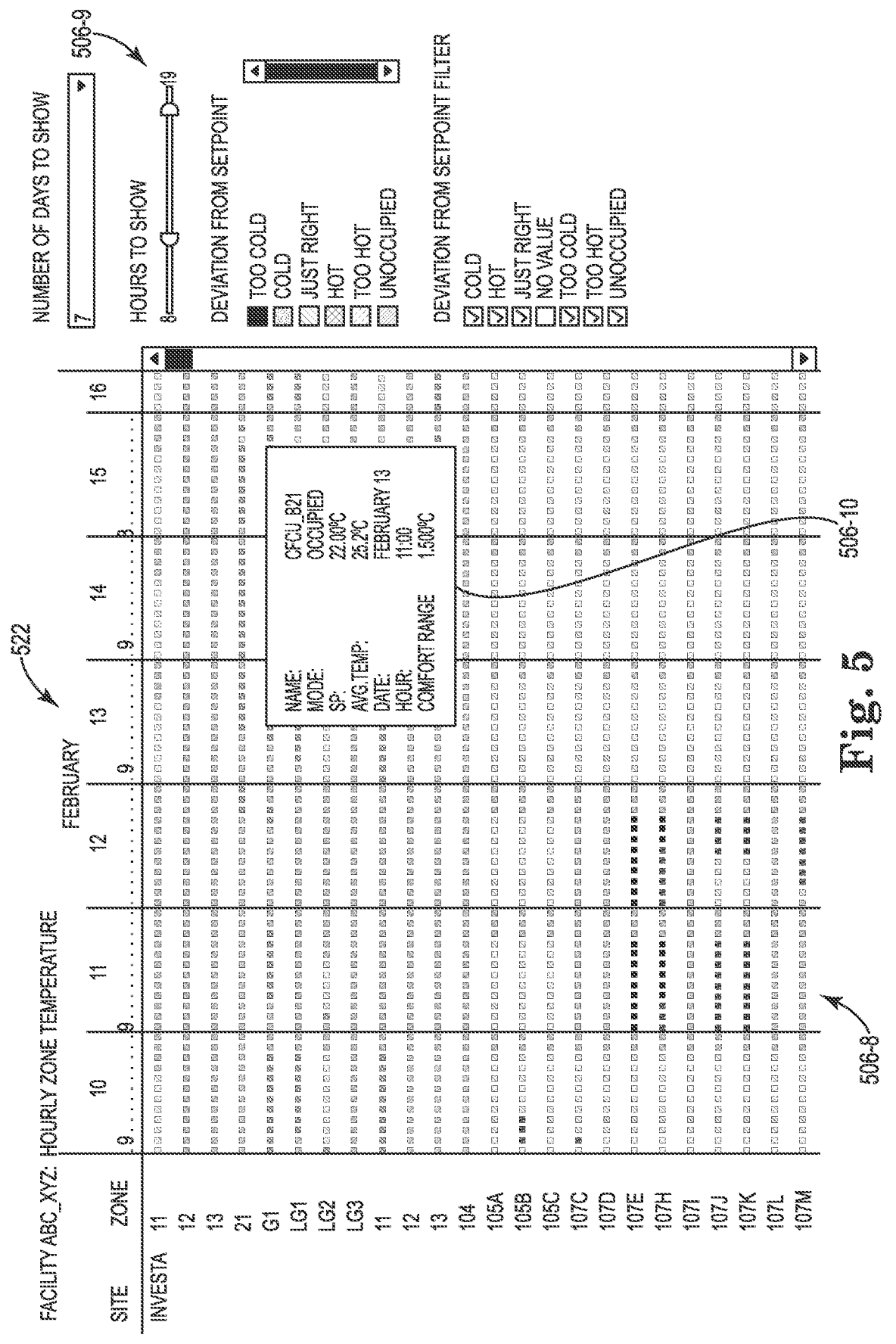

FIG. 5 illustrates a display 522 including a number of widgets 506-8, 506-9, and 506-10 of a comfort dashboard in accordance with one or more embodiments of the present disclosure. The hourly zone temperature widget 506-8 can display the deviation from setpoint for each zone for each hour in a day. As shown in FIG. 5, the further away from the setpoint, the darker the displayed color. In some embodiments, red coloration can indicate too hot, and blue coloration can indicate too cold, though embodiments herein are not so limited. In some embodiments, zones that are within a desired range from setpoint may not be highlighted so that the user readily appreciates those zones that exhibit the most deviation.

Using a display settings widget 506-9, a user can filter the hours to be displayed in the hourly zone temperature widget

506-8. In addition, the user can modify to the number of days to be displayed, how the deviation is displayed (e.g., coloration, cross-hatching, etc.), and which types of deviation are to be displayed.

Selecting or hovering over a particular cell of the hourly zone temperature widget 506-8 corresponding to a zone and an hour can generate a details widget 506-10. The details widget 506-10 can display details such as a name of a device or component (e.g., thermostat and/or controller) assigned to a particular zone, the date, the hour, whether the zone is occupied or unoccupied, the setpoint, the average temperature during that hour, and the value of the range (e.g., from setpoint value), among others.

Figure 6:
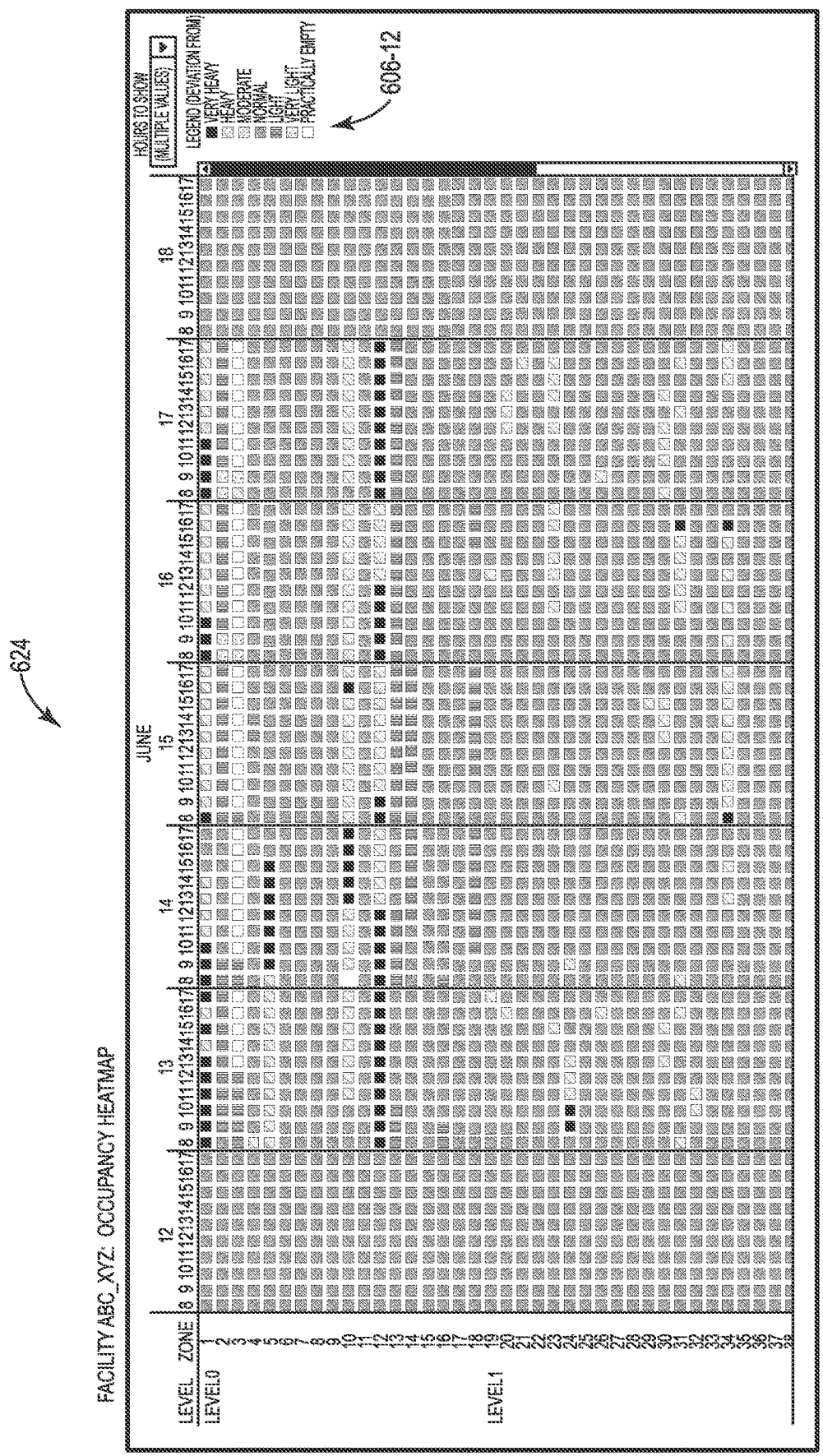
FIG. 6 illustrates another display including a number of widgets of a comfort dashboard in accordance with one or more embodiments of the present disclosure.

FIG. 6 illustrates a display 624 including a number of widgets 606-11, 606-12 of a comfort dashboard in accordance with one or more embodiments of the present disclosure. The occupancy heatmap widget 606-11 can display level of occupancy for each zone for each hour in a day. As shown in FIG. 6, the higher the occupancy level (e.g., the more people in a zone), the darker the displayed color. In some embodiments, zones may be split into levels so that the user can see where in the facility the provision of comfort may be most needed. A display settings widget 606-12 can allow a user to modify which days or hours are to be displayed by the occupancy heatmap widget 606-11.

Figure 7:
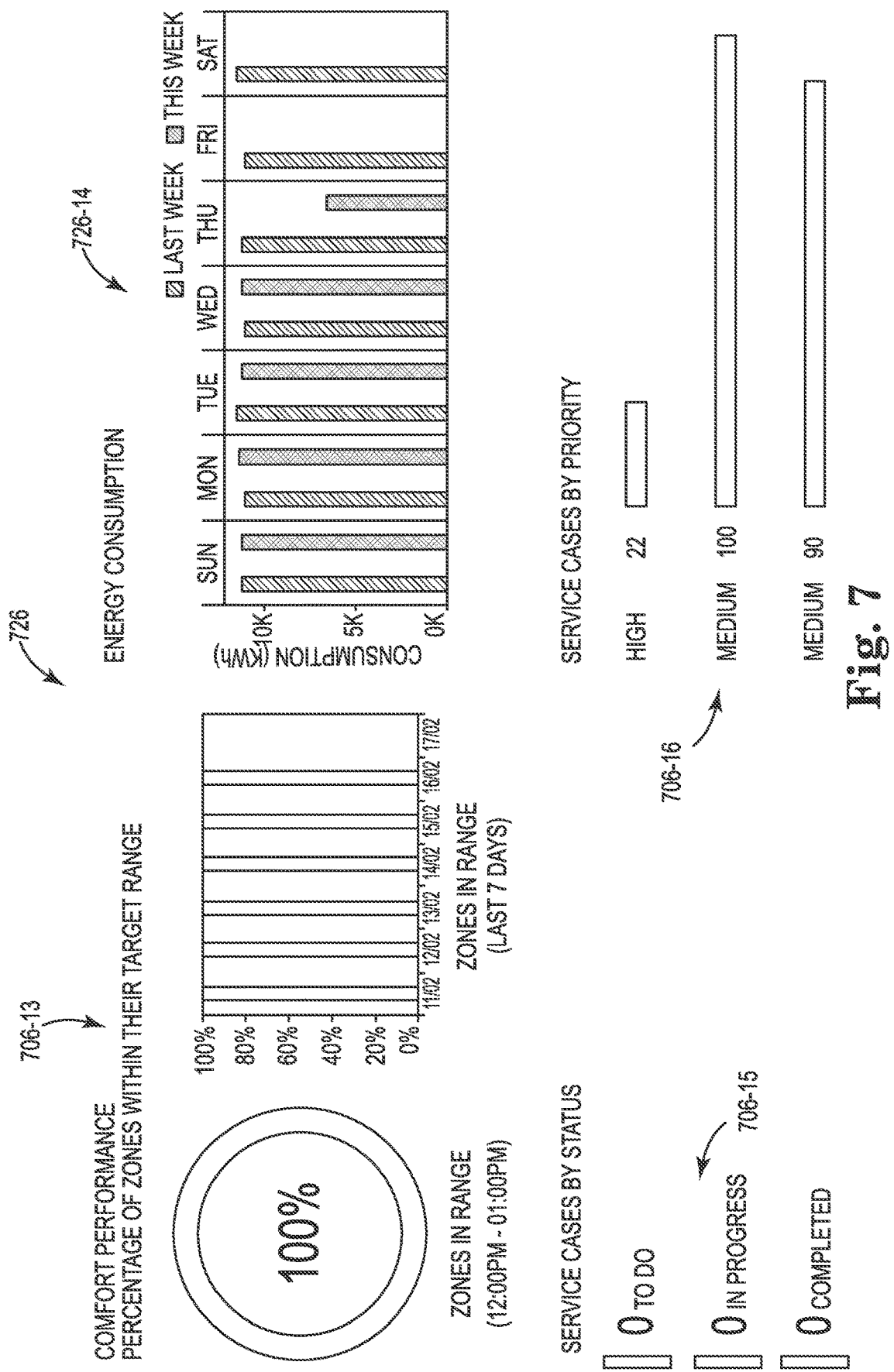
FIG. 7 illustrates another display including a number of widgets of a comfort dashboard in accordance with one or more embodiments of the present disclosure.

FIG. 7 illustrates a display 726 including a number of widgets 706-13, 706-14, 706-15, 706-16, of a comfort dashboard in accordance with one or more embodiments of the present disclosure. The comfort performance widget 706-13 can display a percentage of zones that have exhibited a desired temperature range within a particular time period. The energy consumption widget 706-14 can display a comparison of energy comfort across a plurality of zones between two different time periods. The service cases by status widget 706-15 can display a number of pending service cases or maintenance cases sorted by their respective statuses. The services cases by priority widget 706-16 can display a number of service cases or maintenance cases sorted by their respective priorities.

Figure 8:
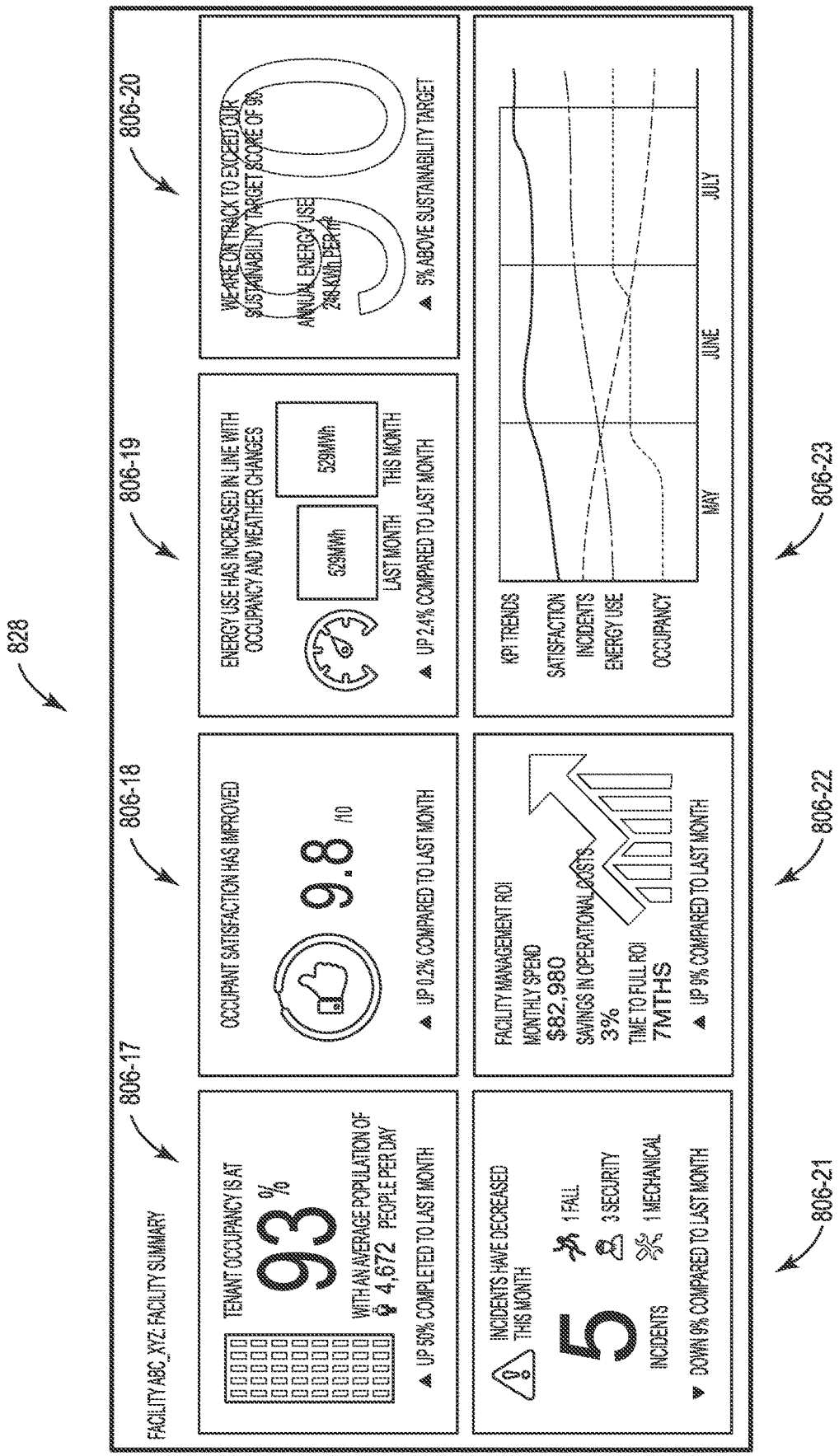
FIG. 8 illustrates another display including a number of widgets of a comfort dashboard in accordance with one or more embodiments of the present disclosure.

FIG. 8 illustrates a display 828 including a number of widgets 806-17, 806-18, 806-19, 806-20, 806-21, 806-22, 806-23, of a comfort dashboard in accordance with one or more embodiments of the present disclosure. The tenant occupancy widget 806-17 can display a percentage of the facility that is currently occupied in conjunction with other information such as average tenant occupancy and/or a comparison to previous time periods.

The occupant satisfaction widget 806-18 can display feedback from occupants of the facility regarding the comfort provided. The normalized energy usage widget 806-19 can display a relationship to an expected energy consumption based on variables such as occupancy and/or weather. The target energy usage widget 806-20 can display a relationship to a target energy consumption goal for a period of time. The incidents widget 806-21 can display an amount and/or trend of facility incidents such as, for example, falls, security breaches, and/or mechanical incidents.

The return on investment (ROI) widget 806-22 can display an amount spent on the provision of comfort over a period of time in conjunction with savings in operational costs and/or a time until full return on investment, in some embodiments. The overall trends widget 806-23 can display trends respectively associated with a variety of factors over a period of time, such as occupant satisfaction, incidents, energy use, and or occupancy, for instance. The display 828 may be of particular use to higher-level management given the increased degree of summarized information and variety beyond thermal comfort.

Figure 9:
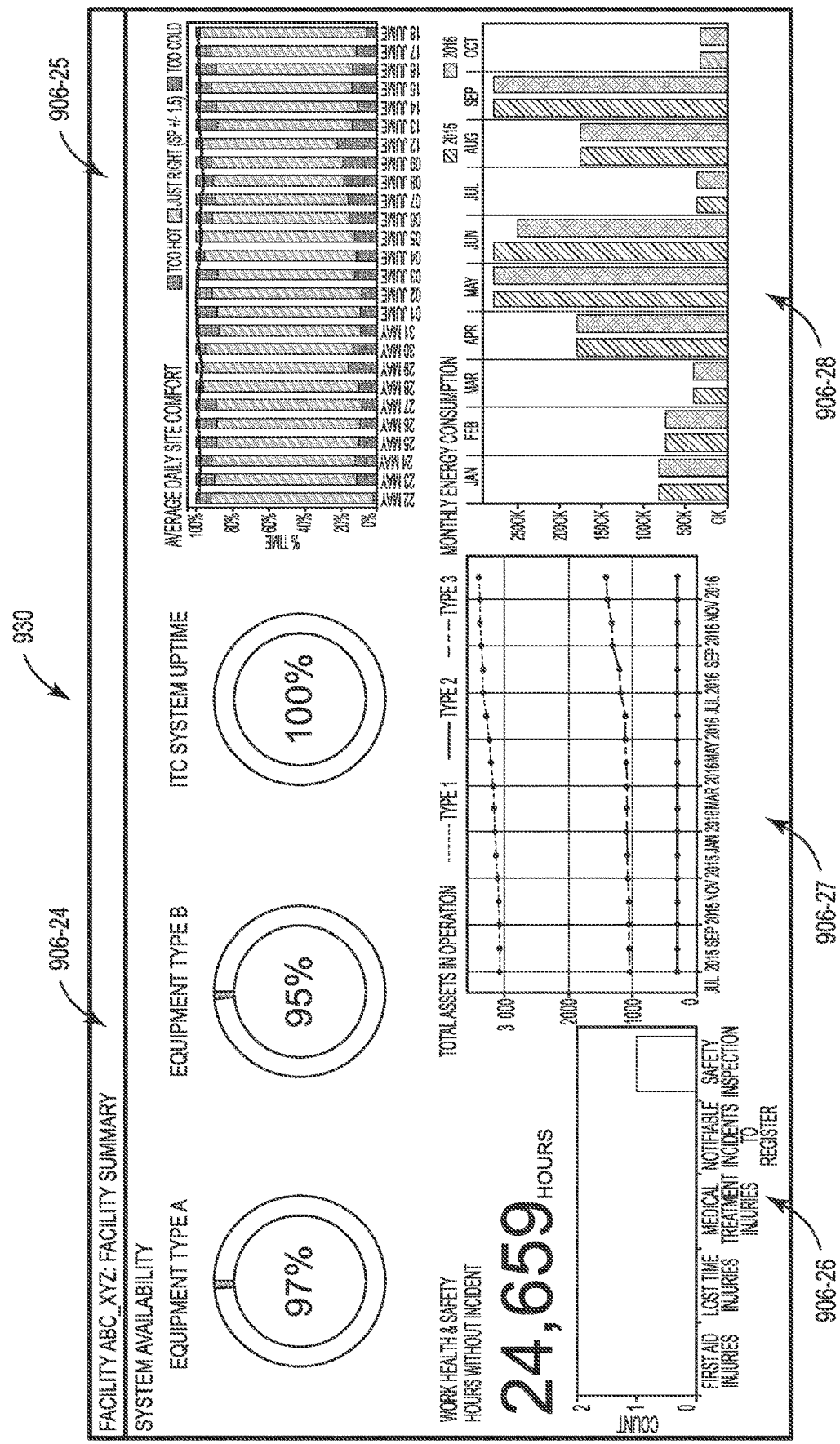
FIG. 9 illustrates another display including a number of widgets of a comfort dashboard in accordance with one or more embodiments of the present disclosure.

FIG. 9 illustrates a display 930 including a number of widgets 906-24, 906-25, 906-26, 906-27, 906-28 of a comfort dashboard in accordance with one or more embodiments of the present disclosure. The system availability widget 906-24 can display the proportion of each of a number of facility systems that is available and/or functioning properly. The average daily site comfort widget 906-25 can display an average daily site comfort in a manner analogous to the widget 306-4 previously discussed in connection with FIG. 3. The work health and safety widget 906-26 can display a length of time since a most recent incident and an identification of that incident. The total assets in operation widget 906-27 can display a respective quantity of a plurality of different facility system devices, components, or equipment. The monthly energy consumption widget 906-28 can display energy consumption over a period of time in conjunction with an analogous and previous period of time (e.g., the same 10 months of two different years).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A system for displaying information related to the operation of a comfort system of a facility that has a plurality of zones, the system comprising:
   a port for receiving operational data from one or more sensors, wherein the operational data is associated with the comfort system of the facility, and wherein the operational data comprises at least human occupancy data associated with each of the plurality of zones;
   a display configured to display a plurality of display elements; and
   one or more processors operatively coupled to the port and the display, the one or more processors configured to:
      process at least some of the operational data associated with the comfort system of the facility;
      determine, based on the processed at least some of the operational data, a first percentage of the facility at the plurality of zones of the comfort system that the comfort system was able to maintain at a corresponding level of comfort over a first predetermined period of time, wherein the first predetermined period of time has a length of at least one hour;
      provide a comfort dashboard on the display to display a first display element of the plurality of display elements, the first display element displaying the first percentage of the facility at the plurality of zones of the comfort system that the comfort system was able to maintain at the corresponding level of comfort over the first predetermined period of time; and alert a user to make an operational change to the comfort system to increase the first percentage of the facility when the comfort system was not able to maintain at the corresponding level of comfort over the first predetermined period of time.

2. The system of claim 1, wherein the one or more processors are configured to receive a user input from the user, and in response, make the operational change to the comfort system to increase the first percentage of the facility.

3. The system of claim 1, wherein the operational data comprises time stamped operational data from one or more edge devices, and the one or more processors are further configured to:

select, for each of the plurality of zones, the operational data that corresponds to the first predetermined period of time;

for each of the plurality of zones, determine using the selected operational data, whether the comfort system was able to maintain each of the plurality of zones at the corresponding level of comfort over the first predetermined period of time; and determine the first percentage of the facility based on a number of the plurality of zones that the comfort system was able to maintain the corresponding level of comfort over the first predetermined period of time versus a total number of the plurality of zones.

4. The system of claim 1, wherein the first display element highlights a particular portion of a shape, wherein the particular portion of the shape relative to the entire shape is representative of the first percentage of the facility at the plurality of zones of the comfort system that the comfort system was able to maintain at the corresponding level of comfort over the first predetermined period of time.

5. The system of claim 4, wherein shape comprises an annulus, wherein the particular portion of the annulus relative to the entire annulus is representative of the first percentage of the facility at the plurality of zones of the comfort system that the comfort system was able to maintain at the corresponding level of comfort over the first predetermined period of time.

6. The system of claim 5, wherein the first display element further includes a textual representation of the first percentage of the facility, and wherein annulus is defined by a region between two concentric rings including an inner ring and an outer ring, wherein the textual representation of the first percentage of the facility is displayed inside of the inner ring.

7. The system of claim 1, further comprising displaying a second display element of the plurality of display elements on the comfort dashboard that displays a second percentage of the plurality of zones of the comfort system that the comfort system was able to maintain at the corresponding level of comfort over a second predetermined period of time, wherein the second predetermined period of time is temporally offset from the first predetermined period of time and/or has a different length than the first predetermined period of time.

8. The system of claim 7, further comprising ordering the first display element and the second display element on the comfort dashboard according to a magnitude of the first percentage of the facility and the second percentage of the facility.

9. The system of claim 1, further comprising:

displaying the plurality of display elements on the comfort dashboard, wherein at least one display element of the plurality of display elements displaying a percentage of the plurality of zones of the comfort system that the comfort system was not able to maintain at the corresponding level of comfort over the first predetermined period of time.

10. The system of claim 1, wherein the one or more processors are configured to:

identify, for each of a plurality of periods of time, the plurality of zones that the comfort system was able to maintain at the corresponding level of comfort and the plurality of zones that the comfort system was not able to maintain at the corresponding level of comfort; and display on the comfort dashboard a second display element that is configured to visually distinguish, for each of the plurality of periods of time, the plurality of zones that the comfort system was able to maintain at the corresponding level of comfort and the plurality of zones that the comfort system was not able to maintain at the corresponding level of comfort.

11. The system of claim 10, wherein the second display element is configured to visually identify, for each of the plurality of periods of time and for each of the plurality of zones that the comfort system was not able to maintain at the corresponding level of comfort, a measure of deviation from the corresponding level of comfort.

12. The system of claim 1, wherein the one or more processors are configured to:

receive user credentials from the user;

determine a role of the user based on the received user credentials, wherein the first percentage of the facility that is displayed on the comfort dashboard is dependent on the determined role of the user.

13. The system of claim 1, wherein the one or more processors are configured to:

classify the plurality of zones into a plurality of zone groups, including a critical zone group; and display an indicator on the comfort dashboard for each of the zones classified in the critical zone group that indicates a percentage of time that the comfort system was not able to maintain the zone at the corresponding level of comfort.

14. The system of claim 1, wherein the one or more processors are configured to display an indicator on the comfort dashboard for each of a plurality of zones that indicates a percentage of time that the comfort system was not able to maintain the particular zone at the corresponding level of comfort.

15. The system of claim 1, wherein the one or more processors are configured to display a trend line of a particular parameter of the comfort system concurrently with the first display element.

16. A non-transient computer readable medium storing instructions thereon that when executed by one or more processors causes the one or more processors to:

process operational data of an HVAC system, wherein the operational data is received from one or more sensors, wherein the operational data comprises at least human occupancy data associated with each of the plurality of zones;

determine, based on the processed operational data, a first percentage of the facility at a plurality of zones of the HVAC system that the HVAC system was able to maintain at a corresponding level of comfort over a first predetermined period of time, wherein the first predetermined period of time has a length of at least one hour;

provide a comfort dashboard to display a first display element of a plurality of display elements, the first display element displaying the first percentage of the facility at the plurality of zones of the HVAC system that the HVAC system was able to maintain at the corresponding level of comfort over the first predetermined period of time; and alert a user to make an operational change to the comfort system to increase the first percentage of the facility when the comfort system was not able to maintain at the corresponding level of comfort over the first predetermined period of time.

17. The non-transient computer readable medium of claim 16, wherein the instructions when executed by the one or more processors causes the one or more processors to display a second display element of the plurality of display elements that displays a second percentage of the plurality of zones of the HVAC system that the HVAC system was able to maintain at the corresponding level of comfort over a second predetermined period of time, wherein the second predetermined period of time is temporally offset from the first predetermined period of time and/or has a different length than the first predetermined period of time.

18. The non-transient computer readable medium of claim 16, wherein the instructions when executed by the one or more processors causes the one or more processors to:
displaying one or more widgets each summarizing data regarding the HVAC system, wherein the one or more widgets correspond to the plurality of display elements;
determining when a pointing device controlled by the user is hovering over one of the one or more widgets; and
when it is determined that the pointing device is hovering over one of the one or more widgets, displaying a pop-up window that displays further information beyond that summarized by the corresponding widget.

19. A method for providing a comfort dashboard, comprising:
receiving operational data from one or more sensors, wherein the operational data is associated with an HVAC system of a facility, wherein the operational data comprises at least human occupancy data associated with at each of the plurality of zones;
receiving credentials associated with a user of a user device;
determining a particular portion of the operational data to display to the user based, at least in part, on the received credentials;
displaying on the user device a summary of the particular portion of the operational data that is associated with the received credentials;
wherein the summary includes at least one display element of a plurality of display elements that is configured to provide a performance indicator that includes a numerical percentage that represents how well thermal comfort in at least part of the facility has been maintained within a target range over a time period of at least one hour; and
alerting a user to make an operational change to the comfort system to increase the first percentage of the facility when the comfort system was not able to maintain at the corresponding level of comfort over the first predetermined period of time.

20. The method of claim 19, wherein the operational data includes:
a setpoint for a zone of the facility at a particular time;
a temperature of the zone of the facility determined by the one or more sensors at the particular time;
wherein the method includes one or more of:
providing the particular portion of the operational data via at least one display element of the plurality of display elements that is configured to display a percentage of time that the temperature of the zone is inside and/or outside of a configured temperature range about the setpoint; and
providing the particular portion of the operational data via at least one display element of the plurality of display elements that is configured to display a quantity of hours of a day that the temperature of the zone is outside of a configured temperature range about the setpoint.

\* \* \* \* \*